U S008939652B2

US008939652B2

(12) United States Patent
Peterson et al.

(10) Patent No.: US 8,939,652 B2
(45) Date of Patent: Jan. 27, 2015

(54) ROLLER BEARING APPARATUSES INCLUDING COMPLIANT ROLLING ELEMENTS, AND RELATED METHODS OF MANUFACTURE

(71) Applicant: US Synthetic Corporation, Orem, UT (US)

(72) Inventors: S. Barrett Peterson, Orem, UT (US); Craig H Cooley, Saratoga Springs, UT (US); David P Miess, Highland, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 13/713,096

(22) Filed: Dec. 13, 2012

(65) Prior Publication Data

US 2014/0169718 A1  Jun. 19, 2014

(51) Int. Cl.
*F16C 33/62* (2006.01)
*F16C 19/22* (2006.01)
*F16C 43/06* (2006.01)
(Continued)

(52) U.S. Cl.
CPC ............... *F16C 19/22* (2013.01); *F16C 43/06* (2013.01); *F16C 33/32* (2013.01); *F16C 33/34* (2013.01); *F16C 33/585* (2013.01); *F16C 33/62* (2013.01); *F16C 2202/08* (2013.01); *F16C 2202/04* (2013.01)
USPC ........................... 384/569; 384/492; 384/622

(58) Field of Classification Search
CPC ............................... F16C 33/58; F16C 33/62
USPC ..................... 384/492, 569, 567, 615, 622
See application file for complete search history.

(56) References Cited

U.S. PATENT DOCUMENTS 3,653,732 A * 4/1972 Fairbank ................... 384/492
5,033,877 A * 7/1991 Bowen ...................... 384/567
(Continued)

FOREIGN PATENT DOCUMENTS

| JP | 2001227550 | 8/2001 |
| WO | WO 04/001238 | 12/2003 |
| WO | WO 2007/026702 | 3/2007 |

OTHER PUBLICATIONS

International Search Report and Written Opinion from International Application No. PCT/US2013/074744 mailed Mar. 19, 2014.
Cooley, et al. "The Development of Open Water-lubricated Polycrystalline Diamond (PCD) Thrust Bearing for Use in Marine Dyrokinetic (MHK) Energy Machines" Nov. 31, 2012 (84 pages).
(Continued)

*Primary Examiner* — Thomas R Hannon
(74) *Attorney, Agent, or Firm* — Dorsey & Whitney LLP

(57) ABSTRACT

In an embodiment, a roller bearing apparatus may include a rotor having first superhard raceway elements distributed circumferentially about an axis. Each first superhard raceway element includes a raceway surface positioned/configured to form a first portion of a raceway. The apparatus includes a stator including second superhard raceway elements generally opposed to the first superhard raceway elements. Each second superhard raceway element includes a raceway surface positioned/configured to form a second portion of the raceway. The apparatus includes rolling elements interposed between the rotor and stator and positioned and configured to roll on the raceway. One or more of the rolling elements may be configured to elastically deform on the raceway during use. At least a portion of the raceway exhibits a first modulus of elasticity greater than a second modulus of elasticity of at least a portion of the one or more of the rolling elements.

20 Claims, 14 Drawing Sheets

(51) Int. Cl.
    *F16C 33/32* (2006.01)
    *F16C 33/34* (2006.01)
    *F16C 33/58* (2006.01)

(56) References Cited

U.S. PATENT DOCUMENTS

| | | | | |
|---|---|---|---|---|
| 5,593,234 | A * | 1/1997 | Liston | 384/492 |
| 7,842,111 | B1 | 11/2010 | Sani et al. | |
| 7,866,418 | B2 | 1/2011 | Bertagnolli et al. | |
| 8,236,074 | B1 | 8/2012 | Bertagnolli et al. | |
| 2010/0014797 | A1 * | 1/2010 | Endres et al. | 384/548 |
| 2013/0188899 | A1 * | 7/2013 | Peterson | 384/548 |

OTHER PUBLICATIONS

Dellacorte "Resilient and Corrosion-Proof Rolling Element Bearings Made From Superelastic Ni-Ti Alloys for Aerospace Mechanism Applications" Prepared for the 2011 Symposium on Rolling Element Bearings sponsored by the American Society of Testing Materials, Apr. 13-14, 2011 (24 pages).

Doll "Tribological Challenges in Wind Turbine Technology" The University of Akron, Nov. 15, 2011 (34 pages).

Link "Gearbox Reliability Collaborative—Phase 1 and 2 Overview" Sandia Turbine Reliability Workshop, Aug. 2-3, 2011 (15 pages).

* cited by examiner

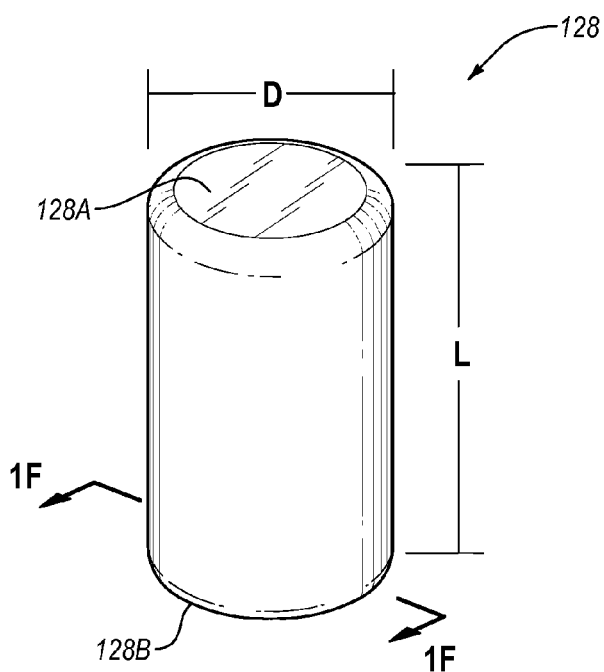
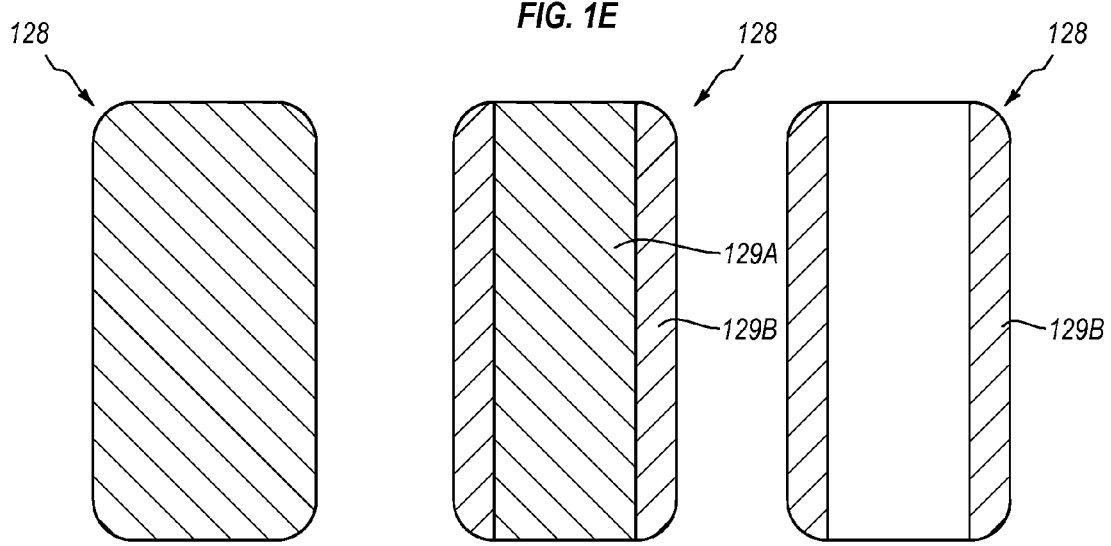
FIG. 1E
FIG. 1F          FIG. 1G          FIG. 1H

ROLLER BEARING APPARATUSES INCLUDING COMPLIANT ROLLING ELEMENTS, AND RELATED METHODS OF MANUFACTURE

BACKGROUND

Roller bearing apparatuses are found in a variety of applications from wind turbines to mining equipment. Typically, roller bearing apparatuses include two races, a plurality of rolling elements between the races, and a roller assembly that separates and guides the rolling elements. Usually one of the races is held fixed. As one of the races rotates, it causes the rolling elements to rotate as well which, in turn, reduces rotational friction between the races. In addition to reducing rotational friction, roller bearing apparatuses typically support bearing loads by transmitting loads between the rolling elements and the races.

However useful, roller bearing apparatuses tend to wear out with use and/or fail without warning. For example, wind turbine gear boxes commonly suffer bearing failure at about one fifth of the designed life expectancy. Many of these bearing failures result from micro pitting, race scuffing, galling, overheating, fatigue failure, flaking, fretting, and other damage due to friction and/or repeated loading and unloading of the rolling elements on the races.

Therefore, manufacturers and users of roller bearing apparatuses continue to seek improved roller bearing apparatus designs and manufacturing techniques.

SUMMARY

Various embodiments of the invention relate to roller bearing apparatuses that include relatively compliant rolling elements. The various embodiments of the bearing assemblies and apparatuses may be used in pumps, wind turbines, transmissions, subterranean drilling systems, and other types of systems.

In an embodiment, a roller bearing apparatus may include a rotor having a first plurality of superhard raceway elements distributed circumferentially about an axis. Each of the first superhard raceway elements includes a raceway surface positioned and configured to from a first portion of a raceway. The rotor also includes a first support ring that carries the first superhard raceway elements. The roller bearing apparatus also includes a stator including a second plurality of superhard raceway elements generally opposed the first superhard raceway elements. Each of the second superhard raceway elements includes a raceway surface positioned and configured to form a second portion of the raceway. The stator also includes a second ring that carries the second superhard raceway elements. The roller bearing apparatus also includes a plurality of rolling elements interposed between the rotor and the stator and positioned and configured to roll on the raceway. One or more of the rolling elements may be further configured to elastically deform on the raceway during use.

In an embodiment, at least a portion of the raceway exhibits a first modulus of elasticity greater than a second modulus of elasticity of at least a portion of the one or more of the rolling elements. For example, the first modulus of elasticity may be about three (3) times greater to about fifty (50) times greater than the second modulus of elasticity.

In an embodiment, one or more of the rolling elements may include one or more superelastic materials that exhibit non-linear deformation during use. For example, the superelastic material may include a superelastic nickel-titanium alloy.

Further embodiments are directed to methods of manufacturing any of the disclosed roller bearing apparatuses.

Other embodiments include applications utilizing the disclosed roller bearing assemblies and apparatuses in various types of pumps, transmission, wind turbines, drilling systems and other applications.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

FIG. 1E is an isometric view of one of the roller elements shown in FIG. 1B according to an embodiment;

FIG. 1F is a cross-sectional view taken along line 1F-1F of the roller element shown in FIG. 1E;

FIG. 1G is a cross-sectional view of a roller element according to another embodiment;

FIG. 1H is a cross-sectional view of a roller element according to another embodiment;

DETAILED DESCRIPTION

Figure 1A:
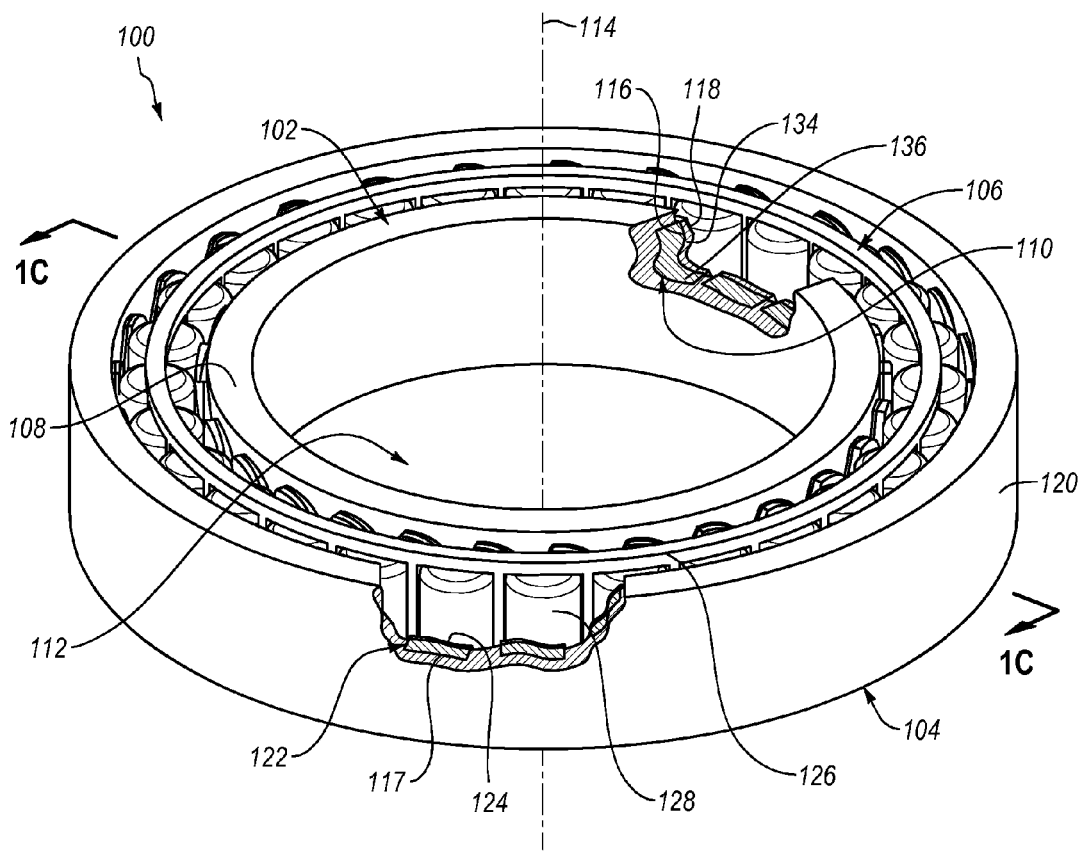
FIG. 1A is an isometric cutaway view of a radial roller bearing apparatus according to an embodiment.
Figure 1B:
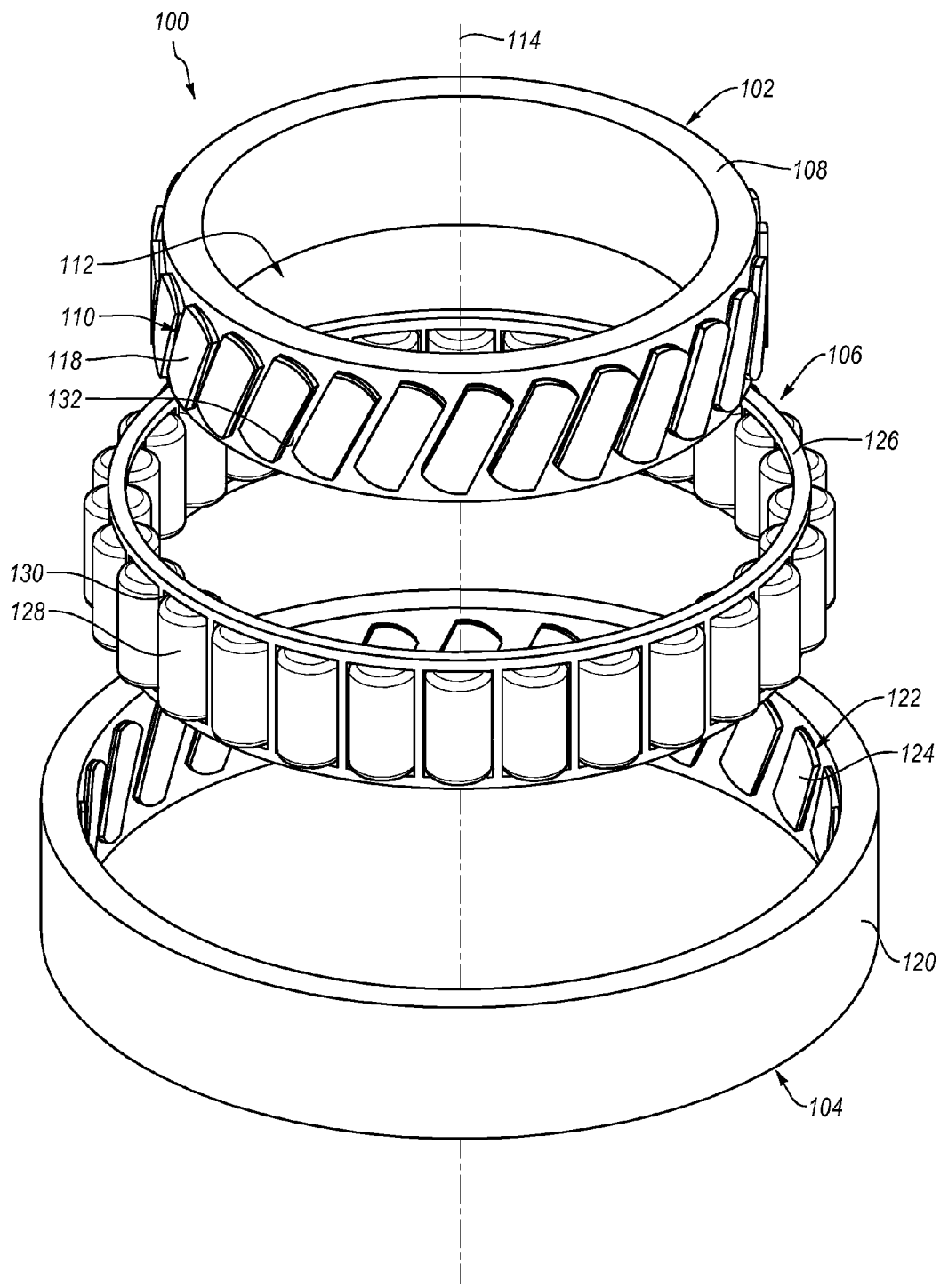
FIG. 1B is an exploded isometric view of the radial roller bearing apparatus shown in FIG. 1A.

Embodiments of the invention relate to roller bearing apparatuses that include rolling elements (e.g., superelastic, metallic, or non-superabrasive rolling elements), motor assemblies that include such roller bearing apparatuses, and related methods. FIG. 1A is an isometric view of a radial roller bearing apparatus 100 and FIG. 1B is an exploded isometric view of the radial roller bearing apparatus 100. The radial roller bearing apparatus 100 may be used in a wind turbine, a pump, a transmission, or other type of system.

As shown in FIGS. 1A and 1B, the radial roller bearing apparatus 100 may include an inner race 102, an outer race 104, and a roller assembly 106. The inner race 102 (e.g., rotor or stator) may include a support ring 108 and a plurality of superhard raceway elements 110. The support ring 108 may define an opening 112 through which a shaft or spindle (not shown) of, for example, a wind turbine may extend. The outer race 104 (e.g., rotor or stator) may extend about and receive the inner race 102 and the roller assembly 106. The outer race 104 may include a support ring 120 and a plurality of superhard raceway elements 122. The roller assembly 106 may be interposed between the inner race 102 and the outer race 104 and may include a cage 126 and a plurality of rolling elements 128. The superhard raceway elements 110, 122 of the inner race 102 and the outer race 104, respectively, may be configured and positioned to at least partially define a raceway for the rolling elements 128. A raceway is a substantially continuous or discontinuous surface or surfaces over which the rolling elements 128 roll over/run on. Rotation of the inner race 102 and/or the outer race 104 may cause the rolling elements 128 to roll or run on the raceway formed between the superhard raceway elements 110 and the superhard raceway elements 122. As described in more detail below, the rolling elements 128 and/or the superhard raceway elements 110, 122 may include one or more features, either alone or in combination, configured to help reduce wear and/or failure of (e.g., flaking, strain, pitting, or combinations thereof) of the radial roller bearing apparatus 100. For example, in an embodiment, the rolling elements 128 may include one or more metallic materials (e.g., steel or a superelastic alloy) and/or non-superabrasive materials and the raceway may include one or more superhard or superabrasive materials such as polycrystalline diamond, polycrystalline cubic boron nitride, silicon carbide, tungsten carbide, or any combination of the foregoing superhard materials. By varying the material design between the rolling elements 128 and/or the raceway, common failure modes such as welding, galling, and/or scuffing may be reduced.

The inner race 102 may form a rotor or a stator of the radial roller bearing apparatus 100. In the illustrated embodiment, the support ring 108 is substantially cylindrical and defines the opening 112. The support ring 108 may be circular and made from a variety of different materials. For example, the support ring 108 may comprise carbon steel, stainless steel, alloy steel, tungsten carbide, or another suitable material. In the illustrated embodiment, the support ring 108 exhibits an inner surface that is substantially congruent with respect to an outer surface. The support ring 108 may also include a plurality of recesses 116 (FIG. 1C) formed therein.

The inner race 102 may also include the plurality of superhard raceway elements 110 each of which includes a substrate 136 and a superhard table 134 bonded to the substrate 136. The superhard raceway elements 110 are illustrated being distributed circumferentially about a rotation axis 114. Each of the superhard raceway elements 110 may include a convexly-curved raceway surface 118 that defines at least part of the raceway. In the illustrated embodiment, gaps 132 or other offsets may be located between adjacent ones of the superhard raceway elements 110. A width of one or more of the gaps 132 or an average width of the gaps 132 may be about 0.00020 inches to about 0.100 inches, and more particularly about 0.00020 inches (0.00508 mm) to about 0.020 inches (0.508 mm). In other embodiments, one or more of the gaps 132 may exhibit larger or smaller widths. Optionally, the gaps 132 may be configured to limit lubricating fluid from being able to leak between adjacent superhard raceway elements 110. For example, the gaps 132 may exhibit a relatively small width. As the gaps 132 decrease in size, it may become more difficult for lubricating fluid to flow between the superhard raceway elements 110. However, it should be noted that in at least some operational conditions, entrained lubricating fluid in the gaps 132 may assist with formation of a hydrodynamic film on at least one of the raceway surfaces 118. In other embodiments, the gaps 132 may exhibit a relatively large width. As the width of the gaps 132 increases, the gaps 132 may be configured to improve heat transfer. For example, the gaps 132 may be configured to form flow paths for the lubricating fluid to flow over and/or around the superhard raceway elements 110. As the size of the gaps 132 increase, fluid flow and heat transfer may more fully develop between adjacent superhard raceway elements 110. Thus, by varying the configuration and size of the gaps 132, the gaps 132 may be optionally configured to impart a desired amount of heat transfer and/or hydrodynamic film formation during operation.

In an embodiment, the gaps 132 may be at least partially occupied by a portion of the support ring 108. Such a configuration may increase the contact surface between the support ring 108 and each of the superhard raceway elements 110 to help affix the superhard raceway elements 110 to the support ring 108. In other embodiments, the recesses 116 may be configured and positioned such that the gaps 132 are omitted. For example, the recesses 116 may be interconnected to form a slot or channel such that adjacent superhard raceway elements 110 are adjacent to one another and/or about one another.

Figure 1C:
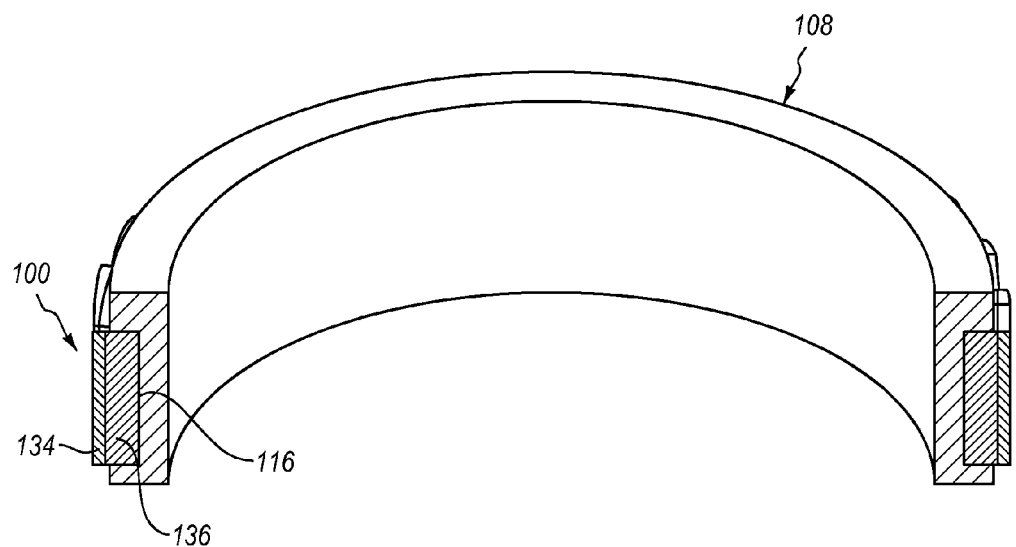
FIG. 1C is a cross-sectional view taken along line 1C-1C of the inner race shown in FIG. 1A.

Referring now to FIG. 1C, each of the superhard raceway elements 110 may be partially disposed in a corresponding one of the recesses 116 of the support ring 108 and secured partially therein via brazing, press-fitting, threadly attaching, fastening with a fastener, combinations of the foregoing, or another suitable technique. As used herein, a "superhard raceway element" is a raceway element including a raceway surface that is made from a material exhibiting a hardness that is at least as hard as tungsten carbide.

In any of the embodiments disclosed herein, the superhard raceway elements (e.g., superhard raceway elements 110) may be made from a number of different superhard materials, such as polycrystalline diamond, polycrystalline cubic boron nitride, silicon carbide, tungsten carbide, or any combination of the foregoing superhard materials. For example, superhard raceway elements having a PCD table may be formed and bonded to a substrate using an ultra-high pressure, ultra-high temperature ("HPHT") sintering process. Such superhard raceway elements having a PCD table may be fabricated by placing a cemented carbide substrate, such as a cobalt-cemented tungsten carbide substrate, into a container or cartridge with a volume of diamond particles positioned on a surface of the cemented carbide substrate. A number of such cartridges may be loaded into an HPHT press. The substrates and diamond particles may then be processed under HPHT conditions in the presence of a catalyst material that causes the diamond particles to bond to one another to form a diamond table having a matrix of bonded diamond crystals. The catalyst material is often a metal-solvent catalyst, such as cobalt, nickel, or iron, which facilitates intergrowth and bonding of the diamond particles. In an embodiment, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt may act as a catalyst to facilitate the formation of bonded diamond grains.

In any of the embodiments disclosed herein, the polycrystalline diamond table may be leached to at least partially or substantially completely remove the metal-solvent catalyst (e.g., cobalt, iron, nickel, or alloys thereof) that was used to initially sinter precursor diamond particles that form the polycrystalline diamond. In another embodiment, an infiltrant used to re-infiltrate a preformed leached polycrystalline diamond table may be leached or otherwise removed to a selected depth from a raceway surface. Moreover, in any of the embodiments disclosed herein, the polycrystalline diamond may be unleached and include a metal-solvent catalyst (e.g., cobalt, iron, nickel, or alloys thereof) that was used to initially sinter the precursor diamond particles that form the polycrystalline diamond or an infiltrant used to re-infiltrate a preformed leached polycrystalline diamond table. Other examples of methods for fabricating the superhard raceway elements are disclosed in U.S. Pat. Nos. 7,866,418, 7,842,111; and 8,236,074, the disclosure of each of which is incorporated herein, in its entirety, by this reference.

The diamond particles that may form the polycrystalline diamond in the superhard table 134 may also exhibit a larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the diamond particles may include a portion exhibiting a relatively larger size (e.g., 40 µm, 30 µm, 20 µm, 15 µm, 12 µm, 10 µm, 8 µm) and another portion exhibiting at least one relatively smaller size (e.g., 6 µm, 5 µm, 4 µm, 3 µm, 2 µm, 1 µm, 0.5 µm, less than 0.5 µm, 0.1 µm, less than 0.1 µm). In an embodiment, the diamond particles may include a portion exhibiting a relatively larger size between about 10 µm and about 40 µm and another portion exhibiting a relatively smaller size between about 1 µm and about 4 µm. In some embodiments, the diamond particles may comprise three or more different sizes (e.g., one relatively larger size and two or more relatively smaller sizes), without limitation. Upon HPHT sintering the diamond particles to form the polycrystalline diamond, the polycrystalline diamond may, in some cases, exhibit an average grain size that is the same or similar to any of the diamond particles sizes and distributions discussed above. Additionally, in any of the embodiments disclosed herein, the superhard raceway elements 110 may be free-standing (e.g., substrateless) and formed from a polycrystalline diamond body that is at least partially or fully leached to remove a metal-solvent catalyst initially used to sinter the polycrystalline diamond body. In an embodiment, the leached polycrystalline diamond body may be formed to exhibit a porosity of about 1-10% by volume such that the pores of the polycrystalline diamond body may be impregnated with lubricant to assist in minimizing friction caused by contact of the rolling elements 128 on the raceway. In other embodiments, the polycrystalline diamond body may exhibit a selected porosity that is higher or lower.

At least some of the superhard raceway elements 110 may comprise a superhard table 134 including a convexly-curved raceway surface 118 (i.e., curving to lie on an imaginary cylindrical surface) as shown in FIGS. 1B and 1C. Each of the superhard tables 134 may be bonded to a corresponding substrate 136. Optionally, one or more of the superhard raceway elements 110 may exhibit a peripherally-extending edge chamfer and/or radius. However, in other embodiments, the edge chamfer or radius may be omitted.

Figure 1D:
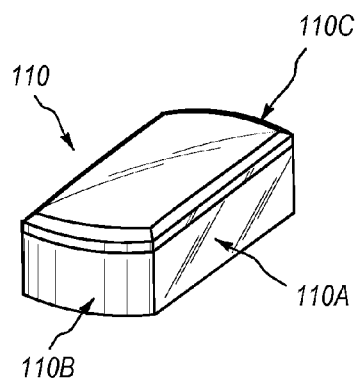
FIG. 1D is an isometric view of one of the superhard raceway elements shown in FIG. 1C.

The superhard raceway elements 110 may have any suitable individual shape. As best shown in FIG. 1D, each superhard raceway element 110 may have a generally rounded rectangular-shaped body including a pair of generally parallel side surfaces 110A, a first end surface 110B, and a second end surface 110C. The side surfaces 110A may extend between the first end surface 110B and the second end surface 110C and vice versa. In the illustrated embodiment, both the first end surface 110B and the second end surface 110C may have a generally convex curvature. In other embodiments, the superhard raceway elements 110 may have a generally elliptical shape, a generally wedge-like shape, a generally cylindrical shape, or any other suitable body shape.

Figure 1I:
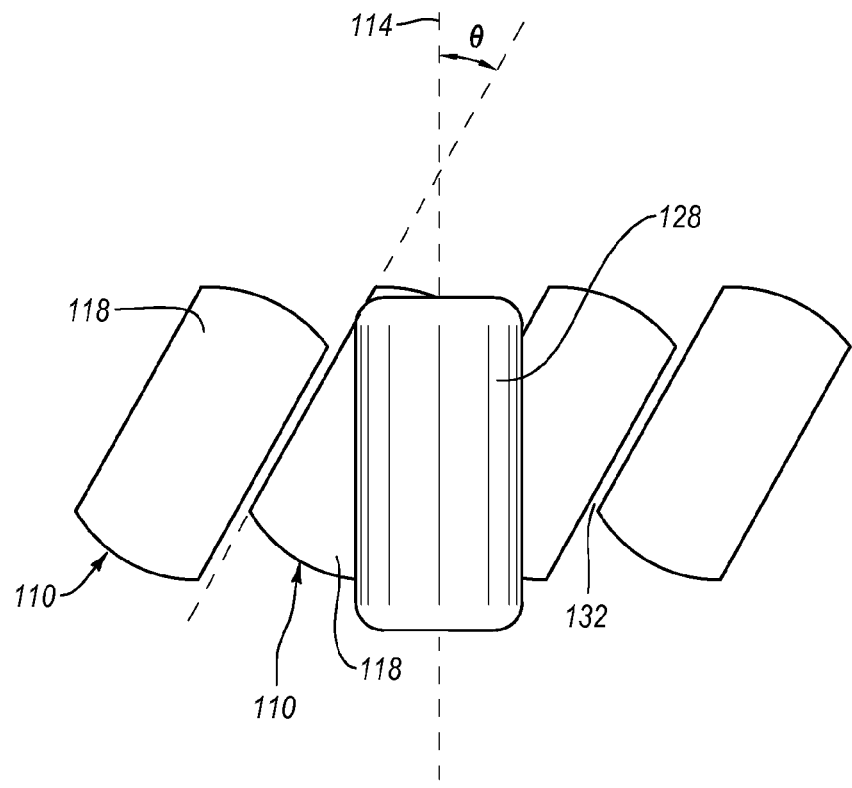
FIG. 1I is a partial side elevation view of the inner race and one of the rolling elements shown in FIG. 1A.

In an embodiment, the superhard raceway elements 110 may be configured to help prevent the rolling elements 128 from lodging in the gaps 132 and/or to maintain contact with the superhard raceway elements 110 as the rolling elements 128 roll over the raceway surfaces 118 during use. For example, at least one or both of side surfaces 110A of the superhard raceway elements 110 may be oriented at an oblique angle θ (shown in FIG. 1I) relative to the rotation axis 114. In some embodiments, each of the superhard raceway elements 110 may be substantially at the same general oblique angle θ relative to the rotation axis 114, while in other embodiments, the oblique angles θ may be different. In an embodiment, the angle θ may be about 40 degrees to about 85 degrees; about 50 degrees to about 80 degrees; or about 55 degrees to about 75 degrees. In other embodiments, the angle θ may be larger or smaller. The angle θ may be selected such that only a portion of one of the rolling elements 128 extends across one of the gaps 132 between two of the superhard raceway elements 110 at any given time, while the rolling element 128 maintains contact with the two superhard raceway elements 110. Put another way, the line of contact of the rolling element 110 and the superhard raceway elements 110 may be misaligned related to the extension of the gap in length. Thus, the rolling elements may avoid becoming impeded by the gaps 132 during operation. Such a configuration may provide a smoother ride on the raceway for the rolling elements 128.

Referring again to FIGS. 1A and 1B, the outer race 104 may exhibit a configuration similar to the inner race 102. For example, the outer race 104 may include the support ring 120 and the superhard raceway elements 122 mounted or otherwise attached to the support ring 120 with recesses 117 formed in an inner surface of the support ring 120. In the illustrated embodiment, the support ring 120 may include an outer surface substantially parallel to the inner surface. The recesses 117 may be configured to generally correspond to the recesses 116 formed in the support ring 108 of the inner race 102. The superhard raceway elements 122 may exhibit any selected geometric shape. In some embodiments, the superhard raceway elements 122 may have a generally rounded rectangular shape, a cylindrical shape, a wedge-like shape, or any other suitable geometric shape. Each of the superhard raceway elements 122 may include a concavely-curved raceway surface 124. The superhard raceway elements 122 may be made from any of the materials discussed above for the superhard raceway elements 110 and configured and positioned to form at least a portion of the raceway for the rolling elements 128 to roll/run on. For example, at least some of the superhard raceway elements 122 may comprise superhard table 134 bonded to a corresponding substrate 136.

In an embodiment, rotation of the inner race 102 and/or the outer race 104 may cause the rolling elements 128 to roll/run on the raceway formed between the raceway surface 118 of the superhard raceway elements 110 and the raceway surfaces 124 of the superhard raceway elements 122. By forming the raceway with the superhard raceway elements 110, 122, deformation of the support rings 108, 120 and or the risk of fatigue may be reduced because the rolling elements 128 generally avoid contact with the support rings 108, 120. Moreover, fatigue at the contact surface between the superhard raceway elements 110, 122 and the rolling elements 128 may be reduced because superhard material does not deform as much as a traditional raceway surface (i.e., steel) due to the superhard raceway material's high modulus of elasticity. For example, in an embodiment, the superhard table 134 may exhibit a modulus of elasticity between about 800 GPa and about 1200 GPa (e.g., about 800 GPa to about 850 GPa, or about 841 GPa). In other embodiments, the superhard table 134 may exhibit a selected modulus of elasticity that is higher or lower. In an embodiment, the superhard raceway elements 110, 122 may enhance the general load capacity of the radial roller bearing apparatus 100. Further, the superhard raceway elements 110, 122 may form a raceway that exhibits lower friction and is more resistant to abrasion and corrosion than a traditional raceway (i.e., steel). This may be particularly advantageous for wind turbine gearbox applications where frequent starts and stops are expected. Optionally, a relatively high thermal conductivity of the superhard raceway elements 110, 122 may also help reduce adhesive wear and resulting scuffing and micropitting of the raceway and/or the rolling elements 128. For example, the raceway (i.e., raceway surfaces 118, 124) may exhibit a thermal conductivity of about 543 W/m-K which is about twelve (12) times the thermal conductivity of steel. In other embodiments, the raceway may exhibit a thermal conductivity of at least about 300 W/m-K; at least about 800 W/m-K; at least about 1300 W/m-K; of about 2000 W/m-K. In addition, the raceway may exhibit a thermal conductivity of about 300 W/m-K to about 2000 W/m-K; about 700 W/m-K to about 1600 W/m-K; or about 1000 W/m-K to about 1300 W/m-K. In other embodiments, the thermal conductivity of the raceway may be larger or smaller. Accordingly, heat generated by eventual skidding and/or slipping of the rolling elements 128 on the raceway may be quickly conducted away from the raceway to reduce adhesive wear and resulting scuffing and/or micro-pitting. Because of the raceway's large thermal conductivity, heat generated by eventual skidding and slipping of the rolling elements 128 may be more quickly conducted away from the contact surface between the rolling elements 128 and the raceway. In other embodiments, the raceway surfaces 118, 124 and/or the raceway may exhibit thermal conductivities that are higher or lower.

As discussed above, the roller assembly 106 may include the cage 126 and the rolling elements 128. The cage 126 may include a plurality of cage pockets 130 formed in the cage 126 and distributed circumferentially about the rotation axis 114. Each of the cage pockets 130 may be configured to retain one of the rolling elements 128. In the illustrated embodiments, each of the cage pockets 130 may exhibit a substantially rectangular cross-sectional shape. In other embodiments, one or more of the cage pockets 130 may exhibit a generally elliptical cross-sectional shape, a generally circular cross-sectional shape, a generally square cross-sectional shape, a generally trapezoidal cross-sectional shape, or any other suitable cross-sectional shape. The cage pockets 130 may be arranged in a single row about the rotation axis 114. In other embodiments, the cage pockets 130 may be arranged in two rows, three rows, four rows, or any other number of rows. The cage 126 may be made from any number of suitable materials. For example, the cage 126 may comprise a metal, an alloy, an alloy steel, carbon steel, stainless steel, brass, tungsten carbide, or any other suitable material. The rolling elements 128 may be rotatably mounted within the cage pockets 130, with each of the rolling elements 128 having a longitudinal rotation axis substantially parallel to the rotation axis 114.

FIGS. 1E and 1F are isometric and cross-sectional views, respectively, of one of the rolling elements 128 removed from the cage 126. The rolling element 128 may exhibit a generally cylindrical body having a diameter D as well as an upper surface 128A and a lower surface 128B defining a length L extending therebetween. In an embodiment, the upper surface 128A and the lower surface 128B may be generally planar. In other embodiments, the upper surface 128A and/or the lower surface 128B may be generally curved, generally conical, combinations thereof, or may have any other suitable configuration. Variations in the length L and/or the diameter D of the one or more rolling elements 128 may be configured to help resist fatigue and/or ultimate failure and/or influence the rotational speed of the rolling elements 128. In addition, the relationship between the length L of one or more of the rolling elements 128 and the diameter D of the one or more rolling elements 128 may be configured to provide a selected contact area with the raceway use, help resist fatigue, damage, and/or ultimate failure. For example, the diameter D of at least one of the rolling elements 128 may be at least: about ten percent (10%); about twenty percent (20%); about thirty percent (30%); about forty percent (40%); about fifty percent (50%); about sixty percent (60%); about seventy percent (70%); about eighty percent (80%); about ninety percent (90%); about one hundred percent (100%); or about one hundred and ten percent (110%) of the length L of at least one of the rolling elements 128. In addition, the diameter D of at least one of the rolling elements 128 may be about ten percent (10%) to about two hundred percent (200%); or about one hundred percent (100%) of the length L of at least one of the rolling elements 128. In other configurations, the rolling elements 128 may exhibit a generally spherical body, a generally conical body, a generally hourglass-like body, or any other suitable geometric shape.

In an embodiment, the rolling elements 128 (or any of the rolling elements disclosed herein) may at least partially comprise one or more superelastic materials. For example, typical superelastic materials exhibit non-linear elastic deformation during use. Non-linear elastic deformation is elastic deformation characterized by a non-linear relationship between stress and strain. Examples of suitable superelastic materials include, but are not limited to, nickel-titanium alloys (e.g., nitinol or SM-100™ which is a more wear resistant nitinol-type alloy), copper-aluminum-nickel alloys, copper-tin alloys, copper-zinc alloys, iron-manganese-silicon alloys, combinations thereof, or any other suitable superelastic material. Consequently, the rolling elements 128 may exhibit a larger elastic resilience than rolling elements formed of other materials (i.e. steel) such that the rolling elements 128 may help enhance fatigue life of the radial roller bearing apparatus 100. In the illustrated embodiment, the rolling element 128 may be substantially formed of a single superelastic material as shown in FIG. 1F. As shown in FIG. 1G, in other embodiments, the rolling element 128 may include at least an inner core 129A surrounded by an outer layer and/or coating 129B made from any of the superelastic material disclosed herein. The inner core 129A may comprise carbon steel, stainless steel, alloy steel, tungsten carbide, or another suitable material. In other embodiments, the rolling element 128 may include two, three, four, or any suitable number of layers, portions, or coatings of superelastic materials. In other embodiments, the rolling element 128 may include a portion including one or more superelastic materials and another portion not including superelastic materials. In yet other embodiments, the rolling element 128 may not include superelastic materials and/or may include one or more metallic and/or non-superabrasive materials. In other embodiments, as shown in FIG. 1H, one or more of the rolling elements 128 may comprise an outer shell 129B at least partially defining a hollow interior space extending at least partially through the rolling element 128. For example, in an embodiment, one or more of the rolling elements 128 may comprise a generally cylindrical PCD body with the inner core removed to form the outer shell 129B. The outer shell 129B may comprise a superelastic material, PCD, or another suitable material. Such a configuration may help provide flexibility and/or abrasion resistance to the rolling element 128. In other embodiments, such a configuration may help lower the inertia of the rolling element 128.

Figure 1J:
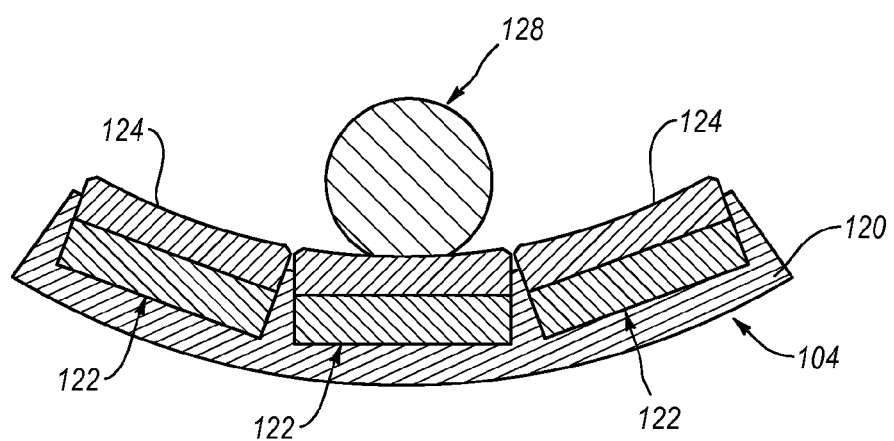
FIG. 1J is a partial cross-sectional view of the inner race and one of the rolling elements shown in FIG. 1A.

FIG. 1J is a partial cross-sectional view of one of the rolling elements 128 running on a portion of the raceway formed by the superhard raceway elements 122 of the outer race 104. As shown, the raceway and/or the rolling elements 128 may also be configured such that the portion of one or more of the rolling elements 128 in contact with the raceway elastically deforms to provide a selected contact area during use. Elastic deformation is a change in shape of a material at a stress that is recoverable after the stress is removed. For example, one or more of the rolling elements 128 may exhibit a modulus of elasticity of about 20 GPa to about 109 GPa. As another example, common superelastic nickel-titanium alloys (e.g., nitinol) from which one or more of the rolling elements 128 may be made have an elastic modulus of about 70 GPa to about 85 GPa in the austenite phase and an elastic modulus of about 28 GPa to about 41 GPa in the stress-induced martensite phase. Thus, in some embodiments, the nickel-titanium alloy may exhibit a martensite deformation temperature ("$M_d$") that is sufficiently high so that stress-induced martensite is generated during loading and operation of the roller bearing apparatus 100 in order to rely on the relatively low elastic modulus of the stress-induced martensite phase. For example, $M_d$ of the superelastic nickel-titanium alloys used herein may be about 100° C. to about 300° C., such as 150° C. to about 200° C. or about 100° C. to about 145° C. In other embodiments, one or more of the rolling elements 128 may exhibit a modulus of elasticity of about 60 GPa to about 90 GPa.

Various embodiments also contemplate that the raceway may exhibit a modulus of elasticity that exceeds a modulus of elasticity of one or more of the rolling elements. For example, the modulus of elasticity of the raceway may be at least: about forty (40) times greater, about thirty (30) times greater, about twenty (20) times greater, about fifteen (15) times greater; about twelve (12) times greater; about nine (9) times greater; about six (6) times greater; or about three (3) times greater than a modulus of elasticity of one or more of the rolling elements 128. In addition, the modulus of elasticity of raceway may be at least: about three (3) times greater to about fifty (50) times greater; about five (5) times greater to about fifty (50) times greater; about thirty (30) times greater to about forty five (45) times greater, about twenty (20) times greater to about forty five (45) times greater, about seven (7) times greater to about sixteen (16) times greater; or about four (4) times greater to about fourteen (14) times greater than the modulus of elasticity of one or more of the rolling elements 128. The difference between the modulus of elasticity of the rolling elements 128 and the raceway may enhance resistance of the radial roller bearing apparatus 100 to shock and/or vibration loading. In other configurations, the modulus of elasticity of one or more of the rolling elements 128 and the modulus of elasticity of the raceway may be larger or smaller relative to each other. Such a configuration may enhance resistance of the radial roller bearing apparatus 100 to shock and vibration loading. Moreover, in other embodiments, the roller elements 128 and the superhard raceway elements 110, 122 may include different materials such that common failure modes such as welding, galling, and/or scuffing may be reduced. Thus, by varying the material design of the rolling elements 128 and/or the superhard raceway elements 110, 122, the rolling elements 128 and/or the superhard raceway elements 110, 122 may be configured to enhance the bearing life of the radial roller bearing apparatus 100 in one or more different ways.

In an embodiment, the roller elements 128 and the raceway may be configured to influence elastohydrodynamic lubrication and/or elastohydrodynamic fluid film formation. For example, where the loading conditions, modulus of elasticity of the raceway, modulus of elasticity of the rolling elements 128, the rotational speed of the rotor, or combinations thereof is sufficient, an elastohydrodynamic fluid film may develop between the raceway and the rolling elements 128. The portion of the rolling elements 128 in contact with the raceway (i.e., raceway surfaces 118 and/or 124) may elastically deform such that the rolling elements 128 exhibit a greater contact area with the raceway to generate or facilitate fluid formation between the rolling elements 128 and adjacent superhard raceway elements 110 and/or superhard raceway elements 122. In an embodiment, the difference between the modulus of elasticity of the rolling elements 128 and the raceway may help change the geometry and/or nature of contact between the rolling elements 128 and the raceway. For example, a larger deformation of the rolling elements 128 may help form a broader area of contact between the rolling elements 128 and the raceway and also a broader area in which elastohydrodynamic lubrication and/or elastohydrodynamic fluid film formation may occur. Such a configuration may help promote effective elastohydrodynamic lubrication and/or elastohydrodynamic fluid film formation at lower speeds. Consequently, the rolling elements 128 may be configured to help form a fluid film having sufficient pressure and at appropriate loading conditions, and/or to prevent or limit physical contact between the respective raceway and the rolling elements 128 to thereby reduce wear of the superhard raceway elements 110, 122 and/or the rolling elements 128. In such a situation, the radial roller bearing apparatus 100 may be described as operating hydrodynamically. When the rotational speed of the rotor is reduced, the pressure of the fluid film may not be sufficient to prevent the rolling elements 128 and the raceway from contacting each other. Thus, by selecting the modulus of elasticity of the rolling elements 128 and the raceway, the radial roller bearing apparatus 100 may be configured to exhibit a desired amount of elastohydrodynamic lubrication and/or fluid film formation during certain operating conditions.

Figure 2A:
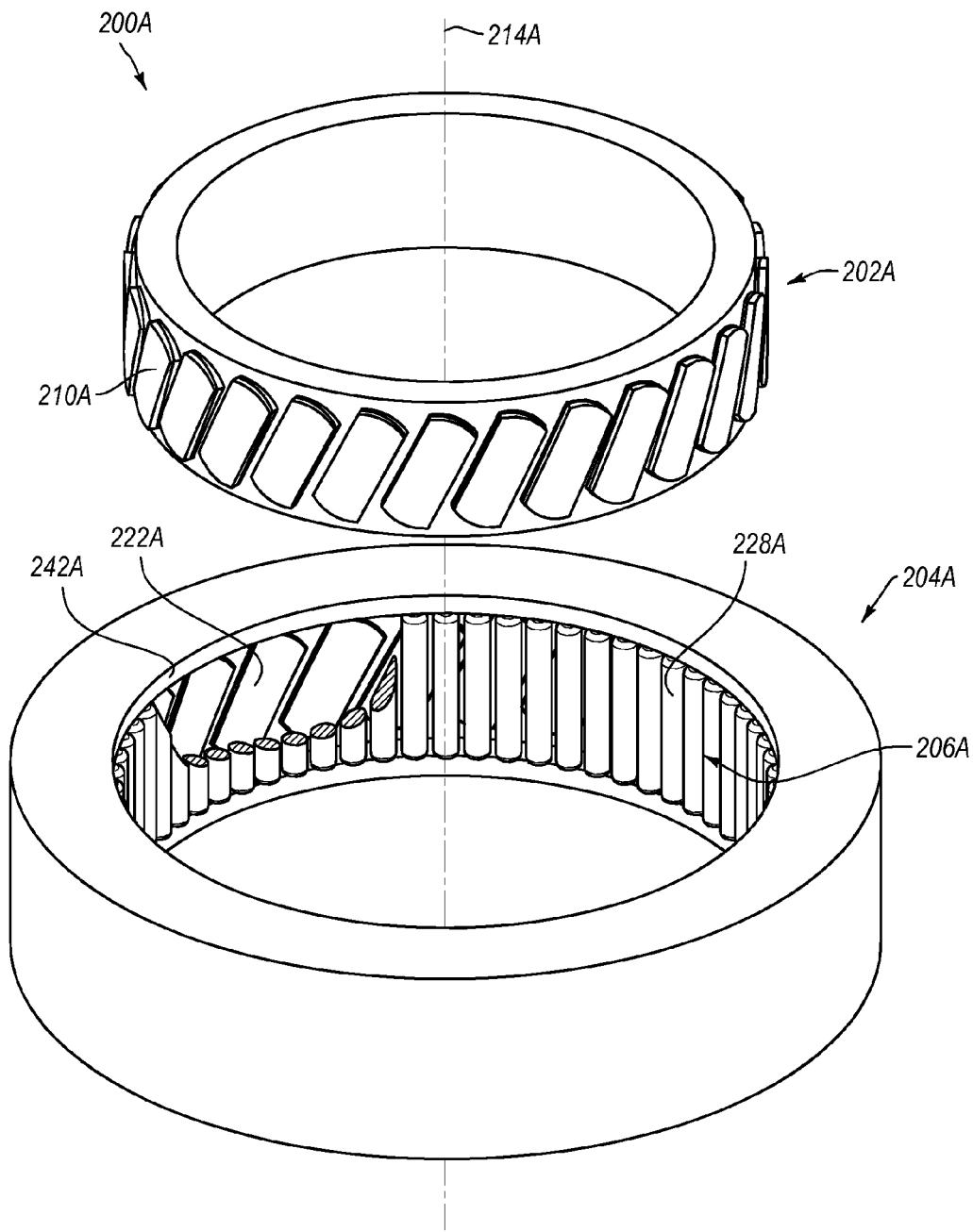
FIG. 2A is an exploded isometric view of a radial roller bearing according to according to another embodiment.

In other embodiments, the radial roller bearing apparatus may include a cageless roller assembly. For example, FIG. 2A is an exploded isometric view of an embodiment of a radial roller bearing apparatus 200A. The principles of the radial roller bearing apparatus 200A may be employed with any of the embodiments described with relation to FIGS. 1A through 1J and vice versa. In the radial roller bearing apparatus 200A, a plurality of elongated rolling elements 228A are circumferentially distributed about a rotation axis 214A and interposed between an inner race 202A having superhard raceway elements 210A and an outer race 204A having superhard raceway elements 222A. As shown, a roller assembly 206A may include the rolling elements 228A positioned between the inner race 202A and the outer race 204A without a cage to separate the rolling elements 228A. Thus, each of the rolling elements 228A may push against other rolling elements 228A to hold the rolling elements 228A in place. The rolling elements 228A may be positioned configured such that the rolling elements may rotate therebetween, with each of the elongated rolling elements 228A having a longitudinal axis substantially parallel to the rotation axis 214A. Optionally, the inner race 202A and/or the outer race 204A may include flange features 242A configured to help maintain the position of rolling elements 228A between the inner race 202A and the outer race 204A. Moreover, the rolling elements 228A may be made from any of the materials discussed above for the rolling elements 128.

Figure 2B:
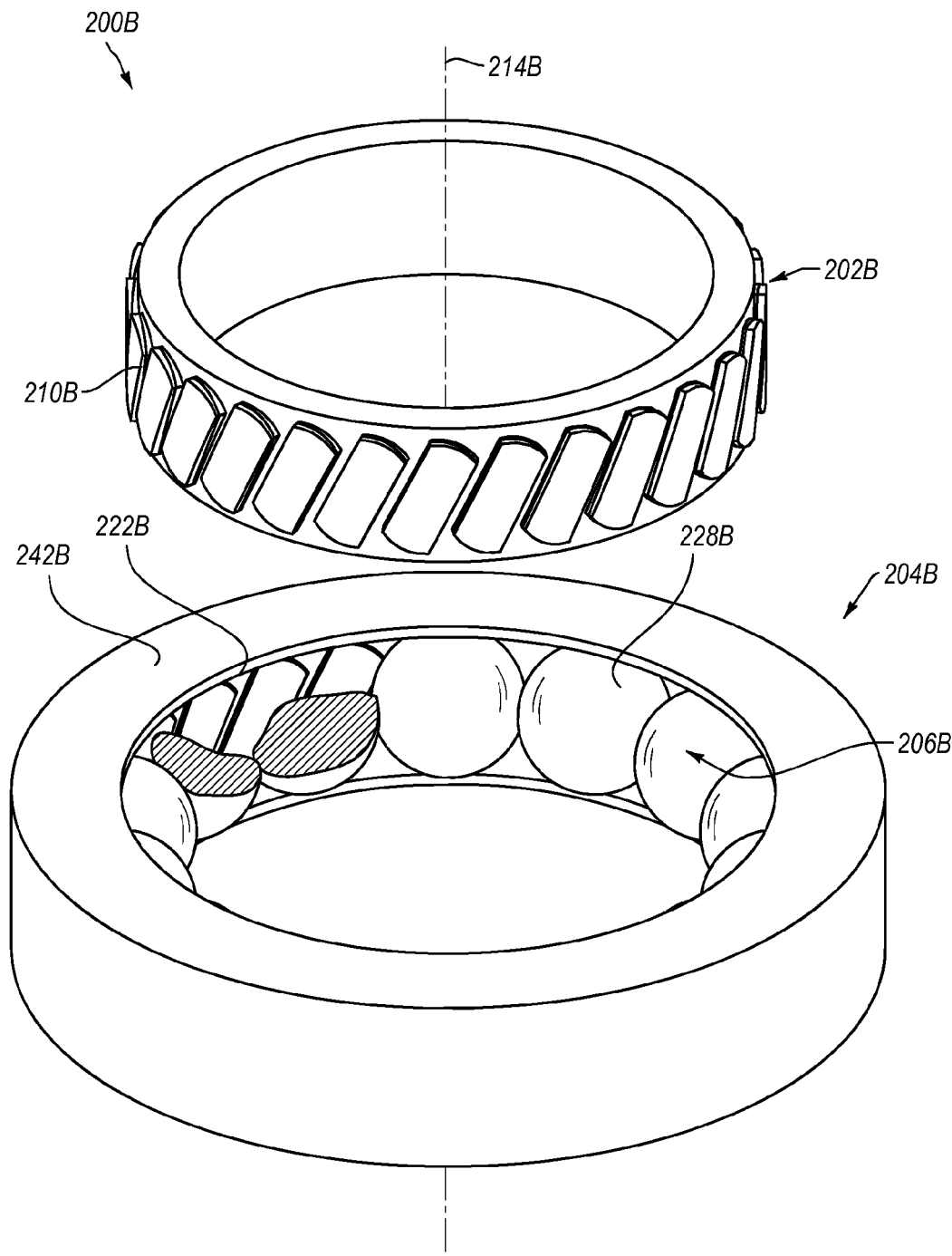
FIG. 2B is an exploded isometric view of a radial roller bearing according to another embodiment.

FIG. 2B is an exploded isometric view of another embodiment of a cageless radial roller bearing apparatus 200B. The principles of the radial roller bearing apparatus 200A may be employed with any of the embodiments described with relation to FIGS. 1A through 2A and vice versa. In the radial roller bearing apparatus 200B, a plurality of generally spherical rolling elements 228B are circumferentially distributed about a rotation axis 214B and interposed between an inner race 202B having superhard raceway elements 210B and an outer race 204B having superhard raceway elements 222B. Like radial roller bearing apparatus 200A, a roller assembly 206B may include the rolling elements 228B positioned between the inner race 202B and the outer race 204B without a cage to separate the spherical rolling elements 228B. Thus, each of the rolling elements 228B may help hold one another in place. Optionally, the inner race 202B and/or the outer race 204B may include flange features 242B configured to help maintain the position of the rolling elements 228B between the inner race 202B and the outer race 204B. Moreover, the rolling elements 228B may be made from any of the materials discussed above for the rolling elements 128.

Figure 3:
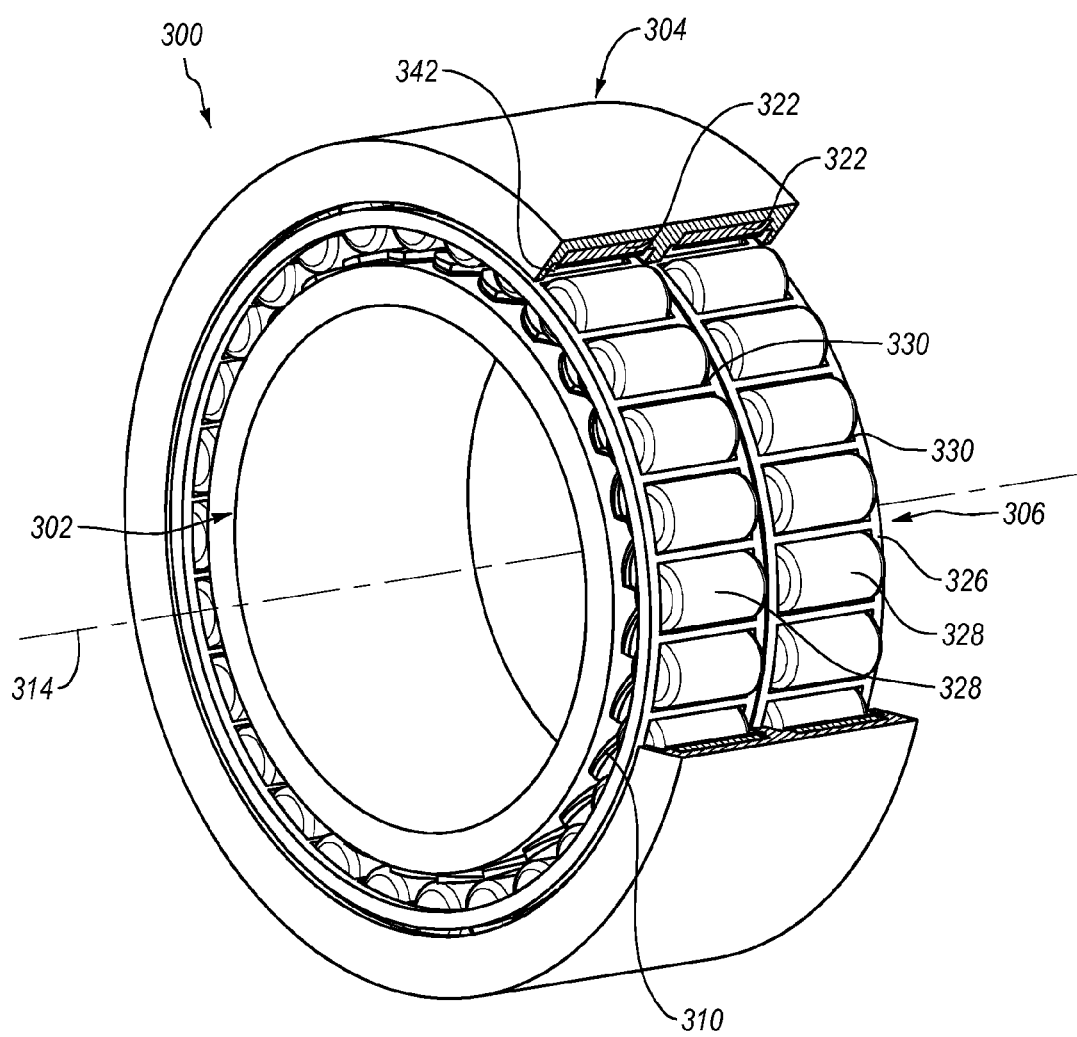
FIG. 3 is an isometric cutaway view of a radial roller bearing according to another embodiment.

In yet other embodiments, the radial roller bearing apparatus may include a plurality of rows of rolling elements and/or superhard raceway elements. For example. FIG. 3 is an isometric cutaway view of a radial roller bearing apparatus 300. The radial roller bearing apparatus 300 has many of the same components and features that are included in the radial roller bearing apparatuses 100 and 200 of FIGS. 1A-2B. Therefore, in the interest of brevity, the components and features of the radial roller bearing apparatuses 100 and 300 that correspond to each other have been provided with identical reference numerals, and an explanation thereof will not be repeated. However, it should be noted that the principles of the radial roller bearing apparatus 300 may be employed with any of the embodiments described with respect to FIGS. 1A through 2B.

In the radial roller bearing apparatus 300, a roller assembly 306 may be interposed between an inner race 302 and an outer race 304 and may include a cage 326 and a plurality of rolling elements 328. The cage 326 of the roller assembly 306 may include a plurality of cage pockets 330 formed in the cage 326 and distributed circumferentially about a rotation axis (not shown) in two rows. Each of the cage pockets 330 may be configured to retain one of the rolling elements 328. Similar to the cage pockets 130, each of the cage pockets 330 may exhibit a substantially rectangular cross-sectional shape. In other embodiments, one or more of the cage pockets 330 may exhibit a generally elliptical cross-sectional shape, a generally circular cross-sectional shape, a generally square cross-sectional shape, a generally trapezoidal cross-sectional shape, or any other suitable cross-sectional shape. The rolling elements 328 may be rotatably mounted within the cage pockets 330, with each of the rolling elements 328 having a longitudinal rotation axis substantially parallel to the rotation axis 314. Similar to the superhard raceway elements 110, 120, the inner race 302 may include superhard raceway elements 310 and the outer race 304 may include superhard raceway elements 322, both configured and positioned to at least partially define a raceway for the rolling elements 328. In the illustrated embodiment, the superhard raceway elements 310 and/or 322 may be sized and distributed about the rotation axis 314 to at least partially define two raceways, one for each row of rolling elements 328. In other embodiments, the superhard raceway elements 310 and/or 322 may be sized and distributed about the rotation axis 314 to at least partially define a single raceway for both of the two rows of rolling elements 328. Optionally, as illustrated, the inner race 302 and/or the outer race 304 may include flange features 342 configured to help maintain the rolling elements 328 between the inner race 302 and the outer race 304.

Superhard raceway elements 310 and/or 322 may include any of the materials discussed above for the superhard raceway elements 110. For example, at some of the superhard raceway elements 310 and/or 322 may include a superhard material such as a PCD. Moreover, the rolling elements 328 may be made from any of the materials discussed above for the rolling elements 128. For example, one or more of the rolling elements 328 may include one or more superelastic materials (e.g., nickel-titanium alloys). In addition, the cage 326 may be made from any of the materials discussed above for the cage 126. For example, cage 326 may comprise a metal, an alloy, an alloy steel, carbon steel, stainless steel, brass, tungsten carbide, or any other suitable material.

In an embodiment, the material design of the superhard raceway elements 310, 322 and/or the rolling elements 328 may be configured to influence the operational life and/or performance of the radial roller bearing apparatus 300. For example, by forming the raceway with the superhard raceway elements 310, 322 including one or more superhard materials, fatigue at the contact surface between the superhard raceway elements 310, 322 and the rolling elements 328 may be reduced because superhard material will not deform as much as a traditional raceway surface (i.e., steel) due to the superhard raceway material's high modulus of elasticity. In other embodiments, the superhard bearing elements 310 and/or 322 or raceway may be configured to exhibit a modulus of elasticity that exceeds a modulus of elasticity of one or more of the rolling elements 328 such that resistance of the radial roller bearing apparatus 300 to shock, vibration loading, and/or common failure modes such as welding, galling, and/or scuffing may be enhanced.

While the roller assembly 306 is illustrated including two rows of cage pockets 330 and/or rolling elements 328, the roller assembly 306 may include three, four, five, or any other suitable number of rows of cage pockets 330 and/or rolling elements 328. Moreover, while each of the rows of cage pockets 330 and/or rolling elements 328 are illustrated exhibiting similar configurations, in other embodiments, the configuration of each row may vary. For example, the roller assembly 306 may include a first row of cage pockets 330 and/or rolling elements 328 that are physically larger (e.g., radius and/or length) than a second row of cage pockets 330 and/or rolling elements 328. In addition, while two rows are superhard raceway elements 310 and 322 are illustrated, in other embodiments, the inner race 302 and/or the outer race 304 may include one row, three rows, four rows, or any suitable number of rows of superhard raceway elements.

Figure 4:
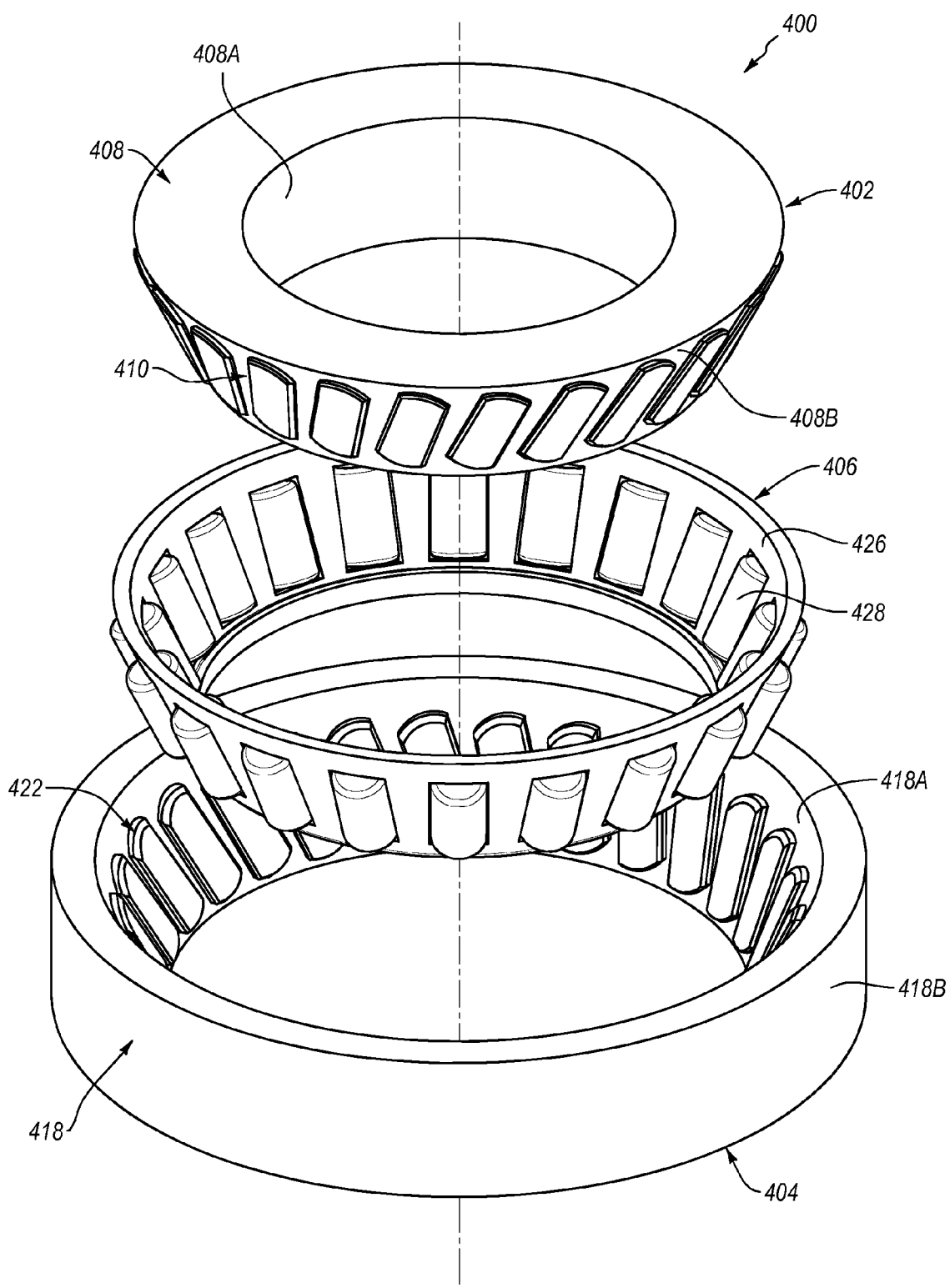
FIG. 4 is an exploded view of a tapered roller bearing apparatus according to another embodiment.

Embodiments of the invention contemplate that the concepts used in the radial roller bearing apparatuses described above may also be employed in a variety of different bearings including, but not limited to, thrust roller bearings, spherical roller bearings, tapered roller bearings, angular contact bearings, ball bearings, linear motion bearings, combinations thereof, or any other suitable type of bearing. For example, FIG. 4 is an exploded isometric view of a tapered roller bearing apparatus 400 according to an embodiment. It should be noted that the principles of the tapered roller bearing apparatus 400 may be employed with any of the embodiments described with respect to FIGS. 1A through 3 and vice versa.

The tapered roller bearing apparatus 400 may include an inner race 402, an outer race 404, and a roller assembly 406. The inner race 402 may include a support ring 408 and a plurality of superhard raceway elements 410. The outer race 404 may include a support ring 418 and a plurality of superhard raceway elements 422. In an embodiment, the support ring 408 may be configured as a cone and the support ring 418 may be configured as a cup. For example, the support ring 418 may extend about and receive the support ring 408. The inner surface 408A of the support ring 408 may be substantially incongruent relative to the outer surface 408B (into which the superhard raceway elements 410 are positioned) of the support ring 408 and substantially congruent relative to the outer surface 418B of the support ring 418. The outer surface 418B of support ring 418 may be curved to lie substantially on an imaginary cylindrical surface. Further, the inner surface 418A (into which the superhard raceway elements 422 are positioned) of the support ring 418 may be substantially incongruent relative to the outer surface 418B of the support ring 418 and substantially congruent relative to the curved outer surface 408B of the support ring 408.

As shown, the roller assembly 406 may be interposed between the inner race 402 and the outer race 404. The roller assembly 406 may include a cage 426 and a plurality of generally cylindrical rolling elements 428. In an embodiment, the support ring 408 and/or the support ring 418 may include respective flange features (not shown) configured to help maintain the rolling elements 428 between the inner race 402 and the outer race 404. In other embodiments, the flange features may be omitted from both the support ring 408 and the support ring 418.

In an embodiment, the superhard raceway elements 410 of the inner race 402 and the superhard raceway elements 422 of the outer race 404 may be positioned and configured to at least partially define a raceway for the rolling elements 428 to run over or roll on during use. For example, the superhard raceway elements 410 may be positioned and configured to form a portion of the raceway on the outer surface 408B of the support ring 408 curved to lie substantially on an imaginary conical surface. Similarly, the superhard raceway elements 422 may be positioned and configured on the inner surface 418A of the support ring 418 to form another portion of the raceway curved to lie substantially on an imaginary conical surface.

In an embodiment, the cage 426, including the rolling elements 428, may form at least a portion of a cone (e.g., a frustoconical ring) and may be configured to be interposed between the conical inner surface 418A of the support ring 418 and the conical outer surface 408B of the support ring 408. When the tapered roller bearing apparatus 400 is loaded with an external force (e.g., wind load), the conical geometric relationship of inner surface 418A and the outer surface 408B may transform the external force into separate load components. Such a configuration may allow the thrust roller bearing apparatus 400 to support both radial and axial loads. In addition, the conical geometric relationship and/or curvature of the raceway may help allow for some degree of shaft misalignment and/or deflection during operation.

While the raceway is shown including one or more portions curved to lie substantially on an imaginary conical surface, one or more portions of the raceway may be curved to lie substantially on an imaginary spherical surface or another curved surface. Moreover, while generally cylindrical rolling elements 428 are illustrated, in other embodiments, the cage 426 may include one or more tapered rolling elements 428, one or more generally spherical rolling elements 428 (e.g., a crowned (barrel) type shape), and/or one or more rolling elements 428 having other suitable geometric shapes.

Superhard raceway elements 410 and/or 422 may include any of the materials discussed above for the superhard raceway elements 110. For example, at least some of the superhard raceway elements 410 and/or 422 may include a PCD table. In addition, the rolling elements 428 may be made from any of the materials discussed above for the rolling elements 128. For example, one or more of the rolling elements 428 may include one or more superelastic materials (e.g., nickel titanium alloys) and/or steel. The cage 426 may also be made from any of the materials discussed above for the cage 126. For example, cage 426 may comprise a metal, an alloy, an alloy steel, carbon steel, stainless steel, brass, tungsten carbide, or any other suitable material. In an embodiment, the material design of the superhard raceways elements 410, 422 and/or the rolling elements 428 may be configured to influence the operational life and/or performance of the tapered roller bearing apparatus 400. For example, by forming the raceway with the superhard raceway elements 410, 422 including one or more selected superhard materials, fatigue at the contact surface between the superhard raceway elements 410, 422 and the rolling elements 428 may be reduced because superhard material will not deform as much as a traditional raceway surface (i.e., steel). This is in part due to the superhard raceway material's high modulus of elasticity.

Figure 5:
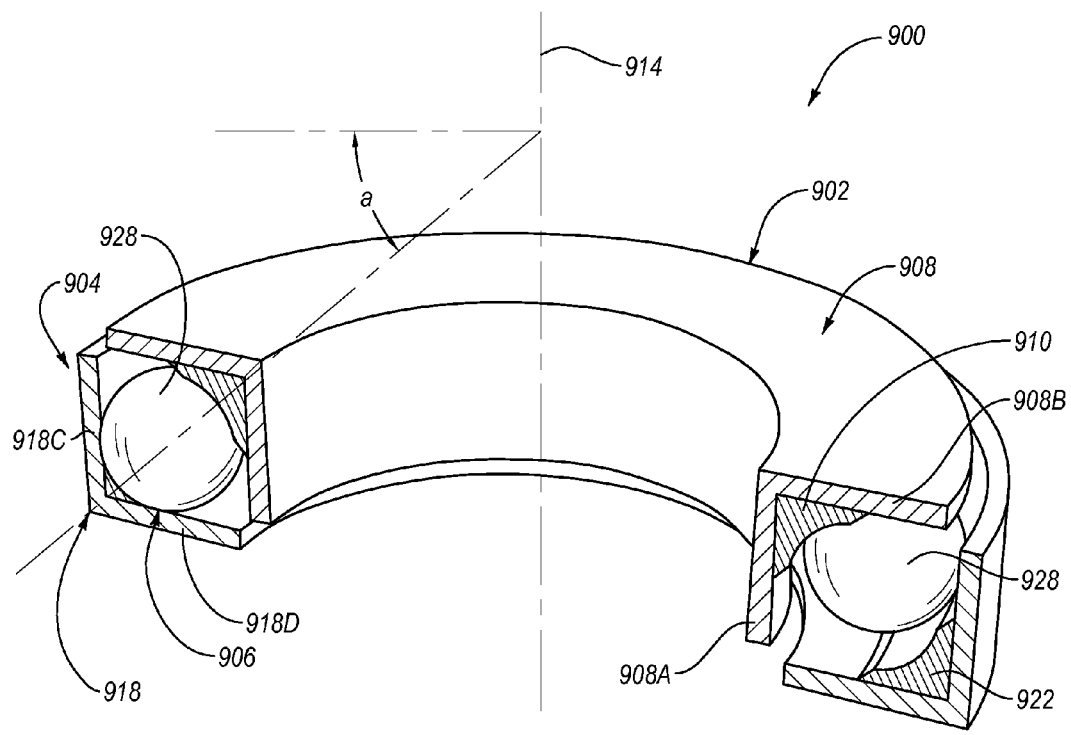
FIG. 5 is an isometric cutaway view of an angular contact bearing according to another embodiment.

FIG. 5 is a partial cutaway view of an angular contact ball bearing apparatus 900 according to an embodiment. It should be noted that the principles of the angular contact ball bearing apparatus 900 may be employed with any of the embodiments described with respect to FIGS. 1A through 4 and vice versa. The angular contact ball bearing apparatus 900 may include an inner race 902, an outer race 904, and a roller assembly 906. The inner race 902 may include a support ring 908 having an inner shoulder 908A and an upper shoulder 908B and a plurality of superhard raceway elements 910. The outer race 904 may include a support ring 918 having an outer shoulder 918C and a lower shoulder 918D and a plurality of superhard raceway elements 922. The support ring 918 of the outer race 904 may extend about and receive the support ring 908 of the inner race 902.

In an embodiment, superhard raceway elements 922 may be positioned between outer shoulder 918C and lower shoulder 918D on an inner surface of support ring 918. Each of the superhard raceway elements 922 may be partially disposed in a corresponding recess formed in the inner surface of support ring 918 and secured partially therein via brazing, press-fitting, threadly attaching, fastening with a fastener, combination of the foregoing, or another suitable technique. In other embodiments, each of the superhard raceway elements 922 may be partially disposed in a common slot for all of the superhard raceway elements 922 formed in the support ring 918. Superhard raceway elements 922 may be configured to at least partially define a raceway curved to lie substantially on an imaginary spherical surface.

In addition, superhard raceway elements 910 may be positioned between inner shoulder 908A and upper shoulder 908D on an inner surface of support ring 908. Each of the superhard raceway elements 910 may be partially disposed in a corresponding recess formed in the inner surface of support ring 908 and secured partially therein via brazing, press-fitting, threadly attaching, fastening with a fastener, combination of the foregoing, or another suitable technique. In other embodiments, each of the superhard raceway elements 910 may be partially disposed in a common slot for all of the superhard raceway elements 910 formed in the support ring 908. Superhard raceway elements 910 may be configured to form at least a portion of a raceway curved to lie substantially on an imaginary spherical surface.

As shown in FIG. 5, in an embodiment, roller assembly 906 may comprise a plurality of generally spherical rolling elements 928 configured to roll or run on the raceway between the inner race 902 and outer race 904. Such a configuration provides the ability to support both thrust and radial loads. In an embodiment, the geometry of angular contact ball bearing apparatus 900 may be selected to influence operation of angular contact ball bearing apparatus 900. For example, the capacity of angular contact ball bearing apparatus 900 to support thrust loads may increase by increasing a contact angle α. The contact angle α is the angle between a line joining points of contact of the rolling element 928 and the portions of the raceway, along which the load is transmitted from one raceway to another, and a line generally perpendicular to the axis 914. In addition, due to displacement between the portions of the raceway formed on the support rings 908, 918 and/or the curvature of the raceway, angular contact ball bearing apparatus 900 may allow for some degree of shaft misalignment or deflection during operation. Such a configuration may allow angular contact ball bearing apparatus 900 to tolerate burst of wind and/or other high impact loads that may be present during operation of wind turbine systems or other systems.

Superhard raceway element 910 and/or 922 may include any of the materials discussed above in relation to superhard bearing elements 110 (e.g., superhard materials). In addition, rolling elements 928 may include any of the materials discussed in relation to rolling elements 128 (e.g., superelastic materials). Like the other roller bearing apparatuses, the material design of the superhard raceway elements 910, 922, and/or rolling elements 928 may be configured to influence the operational life and/or performance of angular contact ball bearing apparatus 900. For example superhard raceway elements 910, 922 may be configured to exhibit a modulus of elasticity that exceeds a modulus of elasticity of one or more of the rolling elements 928 such that resistance of the angular contact ball bearing apparatus 900 to shock, vibration loading, and/or common failure modes such as welding, galling, and/or scuffing may be enhanced.

Figure 6:
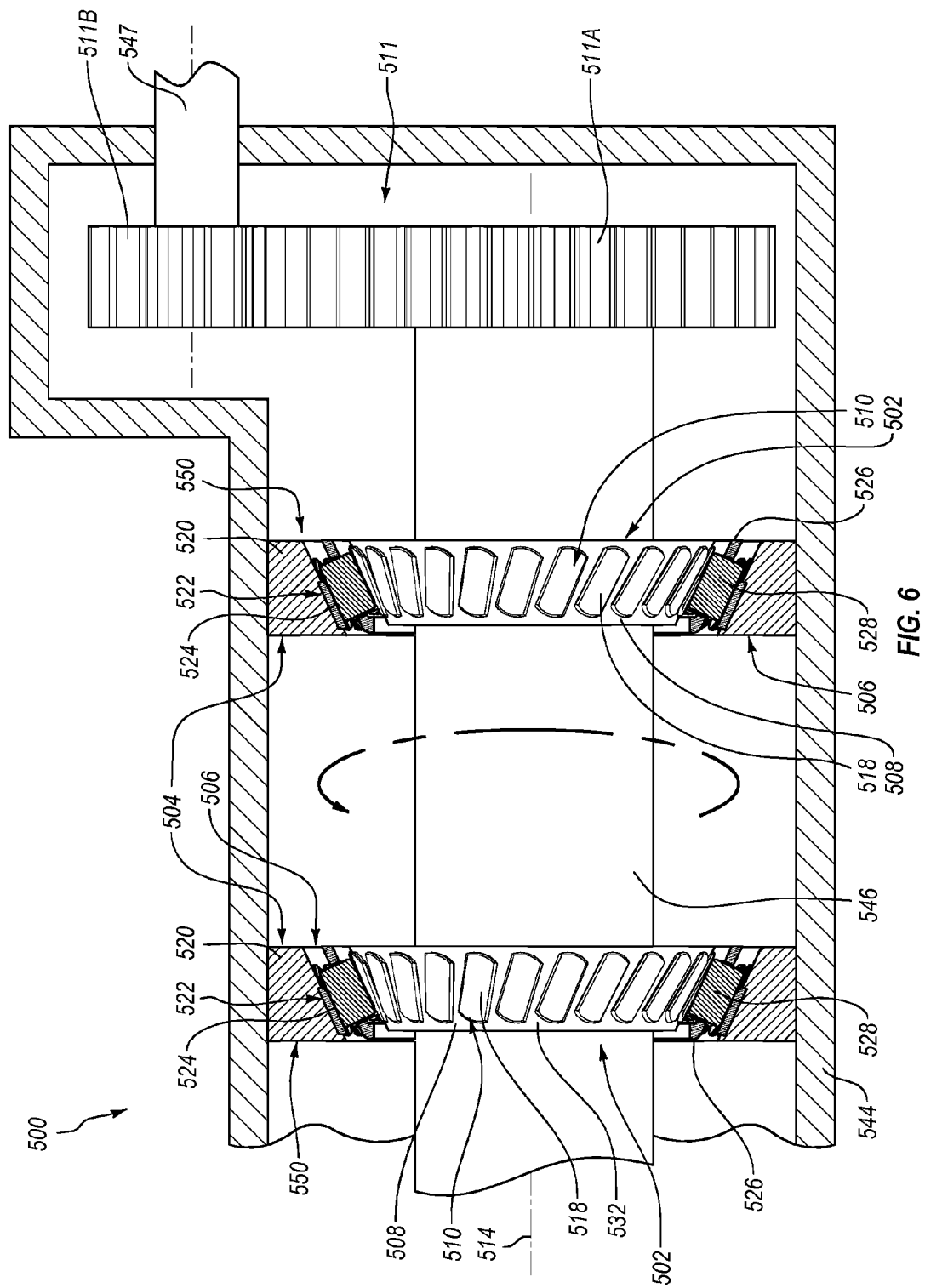
FIG. 6 is a partial isometric cutaway view of a rotary system according to an embodiment.

The roller bearing apparatuses described herein may be employed in a variety of mechanical applications. For example, pumps, turbines, gear boxes or transmissions may benefit from a roller bearing apparatus disclosed herein. FIG. 6 is a partial isometric cutaway view of a wind turbine system 500 according to an embodiment. The system 500 may include a housing 544 and a main gear shaft 546 operably connected to a wind turbine, i.e., blades attached to a hub, (not shown). A pair of tapered roller bearing apparatuses 550 may be operably connected to the main shaft 546. In an embodiment, each of the tapered roller bearing apparatus 550 may be configured similar to tapered roller bearing apparatus 400. For example, each tapered roller bearing apparatus 550 may include an inner race 502 (i.e., rotor), an outer race 504 (i.e., stator), and a roller assembly 506. The shaft 546 may extend through the inner races 502 and may be secured to each inner race 502 by press fitting or otherwise attaching the gear shaft 546 to the inner race 502, threadly coupling the shaft 546 to the inner race 502, or another suitable technique.

In an embodiment, the roller assembly 506 may be interposed between the inner race 502 and the outer race 504. The roller assembly 506 may include a cage 526 having a plurality of cage pockets (not shown) for retaining a plurality of rolling elements 528. The cage 526, including the rolling elements 528, may form at least a portion of a cone (e.g., frustoconical ring). In an embodiment, the rolling elements 528 may exhibit a generally cylindrical geometric shape and may be rotatably mounted within the cage pockets. In other embodiments, at least one of the rolling elements 528 may exhibit a generally spherical geometric shape, a generally conical shape, or any other suitable geometric shape. The rolling elements 528 may include any of the materials discussed above for the rolling elements 128. For example, one or more of the rolling elements 528 may include one or more superelastic materials such that the portion of the rolling elements 528 in contact with the raceway exhibit non-linear elastic deformation and generally conform to the raceway during use. Such a configuration may help reduce stresses experienced by and/or failure of (e.g., flaking, strain, pitting, or combinations thereof) the rolling elements, the superhard raceway elements, and/or the support rings.

In an embodiment, the inner race 502 may include a support ring 508 and a plurality of superhard raceway elements 510 mounted or otherwise attached to the support ring 508. Each of the superhard raceway elements 510 may include a convexly-curved raceway surface 518. As illustrated, the superhard raceway elements 510 may be configured and located to provide a raceway for the rolling elements 528 to roll over/run on. In an embodiment, the superhard raceway elements 510 may be located on the support ring 508 such that gaps 532 or other offsets are formed between adjacent ones of the superhard raceway elements 510. A width of one or more of the gaps 532 or an average width of the gaps 532 may be about 0.00020 inches (0.00508 mm) to about 0.100 inches (2.54 mm), and more particularly about 0.00020 inches (0.00508 mm) to about 0.020 inches (0.508 mm). In other embodiments, one or more of the gaps 132 may exhibit larger or smaller widths. Optionally, one or more of the gaps 532 may exhibit a relatively small width configured to help limit lubricating fluid from being able to leak between adjacent superhard raceway elements 510. For example, the superhard raceway elements 510 may be located on the support ring 508 such that the superhard raceway elements 510 are immediately adjacent to one another to form a closely spaced plurality of the superhard raceway elements 510 at least partially defining the raceway. In other embodiments, the superhard raceway elements 510 may be located on the support ring 508 such that the superhard raceway elements 510 form a substantially contiguous superhard raceway. In other embodiments, one or more of the gaps 532 may exhibit a relatively large width configured to improve heat transfer. Thus, by varying the configuration and size of the gaps 532, the gaps 532 may be optionally configured to impart a desired amount of heat transfer and/or hydrodynamic film formation on the raceway during operation. While the inner race 502 is shown having one row of the superhard raceway elements 510, the inner race 502 may include two rows, three rows, or any suitable number of rows of the superhard raceway elements 510.

In an embodiment, the outer race 504 may extend about and receive the inner race 502 and the roller assembly 506. The outer race 504 may include a support ring 520 and a plurality of superhard raceway elements 522 mounted or otherwise attached to the support ring 520. Each of the superhard raceway elements 522 may include a concavely-curved raceway surface 524. Like the superhard raceway elements 510, the superhard raceway elements 522 may be configured to at least partially define the raceway for the rolling elements 528 to roll over or run on. While the outer race 504 is shown including one row of the superhard raceway elements 522, the outer race 504 may include two rows, three rows, or any number of suitable rows of the superhard raceway elements 522.

The terms "rotor" and "stator" refer to rotating and stationary components of the tapered roller bearing apparatuses 550. Thus, if the outer race 504 is configured to remain stationary, the outer race 504 may be referred to as the stator and the inner race 502 may be referred to as the rotor (or vice versa). Moreover, while the thrust roller bearing apparatuses 550 are illustrated as being similarly configured, the roller bearing apparatuses 550 may have different configurations. For example, one of the thrust roller bearing apparatuses 550 may be configured similar to the thrust roller bearing apparatus 400 and the other roller bearing apparatus 550 may be configured as an angular contact bearing.

In an embodiment, wind may turn the blades on the wind turbine (not shown), which in turn may rotate the main shaft 546 about a rotation axis 514. The main shaft 546 may rotate the inner race 502 about the rotation axis 514, which, in turn, may cause the rolling elements 528 to roll or run on the superhard raceway elements 510 and the superhard raceway elements 522. Similar to thrust bearing apparatus 400, the cone and cup design of the inner race 502 and the outer race 504 may help the tapered roller bearing apparatuses 550 tolerate at least some amount of axial and/or radial misalignment and/or deflection between the inner race 502 and the outer race 504. As shown, the main shaft 546 may go through a gear transmission box 511. For example, the main shaft 546 may be connected to a first gear 511A that turns a second gear 511B or vice versa. The first gear 511A may be larger than the second gear 511B. The second smaller gear 511B may be connected to a shaft 547 that turns a generator (not shown) to produce electricity.

As wind speed increases and energy builds within the system 500, the high thermal conductivity of the superhard raceway elements 510, 522 may help remove heat from the contact surface between the rolling elements 528 and the superhard raceway elements. Such a configuration may help reduce the likelihood of temperature induced strength reductions and/or failure in the radial bearing apparatuses 550. Further, when the raceway surfaces 518, 524 are subjected to vibration under load with minimal rolling movement, the high modulus contrast between the rolling elements 528 and the raceway may help provide resistance to shock and vibration loading. Such a configuration may help reduce the likelihood of fretting, micro pitting, and/or other types of wear in the radial bearing apparatuses 550. This is particularly advantageous given the frequent starts and stops of the system 500. Moreover, in an embodiment, differences between the elasticity of superhard materials forming raceway and the selected materials of the rolling elements 528 may help reduce the likelihood of adhesion.

Figure 7:
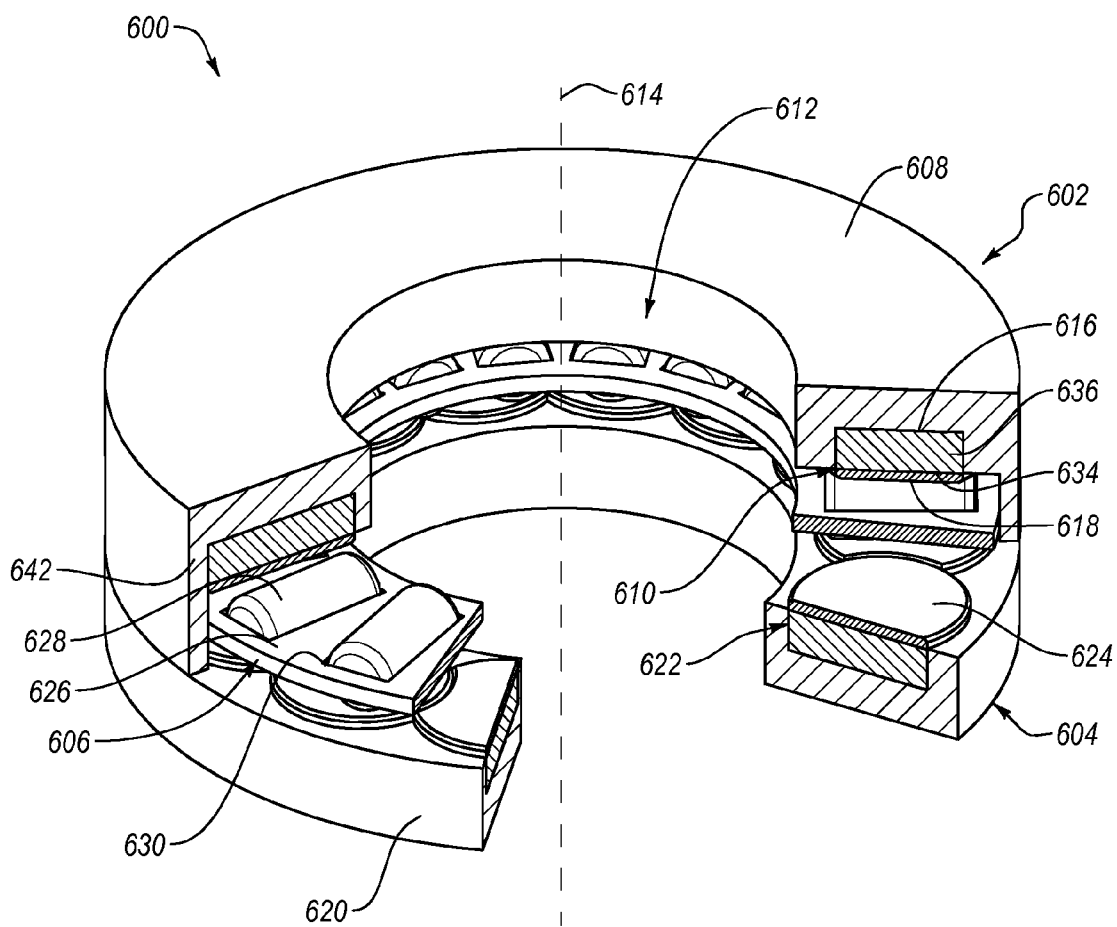
FIG. 7 is an isometric cutaway view of a thrust roller bearing apparatus according to an embodiment.

FIG. 7 is an isometric cutaway view of a thrust bearing roller bearing apparatus 600 according to an embodiment. The thrust roller bearing apparatus 600 may include a stator 602, a roller assembly 606, and a rotor 604. The roller assembly 606 may be interposed between the stator 602 and the rotor 604. The roller assembly 606 may optionally include a cage 626 having a plurality of cage pockets 630 formed in the cage 626 for retaining a plurality of rolling elements 628. Each of the cage pockets 630 may exhibit a substantially rectangular geometric shape and may be distributed circumferentially about a thrust axis 614 along which a thrust force may be generally directed during use. In other embodiments, the cage pockets 630 may exhibit a generally oval, a generally circular, or any other suitable geometric shape. The cage pockets 630 may be arranged in a single row about the thrust axis 614. In other embodiments, the cage pockets 630 may be arranged in two rows, three rows, or any suitable number of rows. The cage 626 may be made from a variety of different materials including carbon steel, stainless steel, cemented tungsten carbide, and the like.

The rolling elements 628 may be rotatably mounted within the cage pockets 630 and may be positioned substantially perpendicular to the thrust axis 614. As illustrated, the rolling elements 628 may be generally cylindrical. In other embodiments, the rolling elements 628 may be generally spherical or other suitable geometric shapes. One or more of the rolling elements 628 may be formed from any of the materials discussed above for the rolling elements 128. For example, the rolling elements 628 may include one or more superelastic materials such that the rolling elements 628 exhibit non-linear elastic deformation and generally conform to the raceway during use.

The stator 602 may include a support ring 608 defining an opening 612 through which a shaft may extend. The support ring 608 may be made from a variety of different materials such as carbon steel, stainless steel, tungsten carbide, combinations thereof, or another suitable material. The stator 602 may further include a plurality of superhard raceway elements 610 and a plurality of interconnected recesses 616 formed in the support ring 608. Each of the superhard raceway elements 610 may be partially disposed in a corresponding one of the recesses 616 via brazing, press-fitting, or another suitable technique. In another embodiment, each of the superhard raceway elements 610 may be partially disposed in a common slot for all of the superhard raceway elements 610 formed in the support ring 608.

The superhard raceway elements 610 are illustrated being distributed circumferentially about the thrust axis 614. In the illustrated embodiment, each of the superhard raceway elements 610 may comprise a superhard table 634 including a raceway surface 618, with the superhard table 634 bonded to a substrate 636. However, in other embodiments, all or some of the superhard raceway elements 610 may be different or even substrateless. In an embodiment, the raceway surfaces 618 may be substantially coplanar to one another. The superhard raceway elements 610 may each be made from any of the materials discussed above for the superhard raceway elements 110. For example, the superhard raceway elements 610 may be made from polycrystalline diamond or any other suitable superhard materials. As shown, the superhard raceway elements 610 may exhibit a geometric shape that is generally formed by the intersection of two cylinders. In other embodiments, the superhard raceway elements 610 may exhibit a generally oval geometric shape, a generally rectangular geometric shape, a wedge-like shape, or any other suitable geometric shape.

The superhard raceway elements 610 may be circumferentially distributed about the thrust axis 614 such that gaps between adjacent ones of the superhard raceway elements 610 are occupied by a portion of the support ring 608. Such a configuration may increase the surface area of the support ring 608 in contact with the superhard raceway elements 610 to help affix the superhard raceway elements 610 to the support ring 608. In other embodiments, the superhard raceway elements 610 may be circumferentially distributed about the thrust axis 614 such that the superhard raceway elements 610 generally abut one another.

In an embodiment, the superhard raceway elements 610 may be configured and located on the support ring 608 to at least partially define a raceway for the rolling elements 628 to roll over or run on. By forming the raceway with the superhard raceway elements 610 and forming the rolling elements 628 with one or more materials having a lower elasticity (e.g., superelastic materials), deformation of the support ring 608 and/or risk of fatigue and eventual failure may be reduced. In addition, the configuration of the superhard raceway elements 610 and the rolling elements 628 may enhance the general load capacity of the thrust roller bearing apparatus 600 and/or reduce friction.

The rotor 604 may be configured similar to the stator 602. For example, the rotor 604 may include a support ring 620 and a plurality of superhard raceway elements 622 mounted or otherwise attached to the support ring 620, with each of the superhard raceway elements 622 having a raceway surface 624. Like the superhard raceway elements 610, the superhard raceway elements 622 may be configured and positioned on the support ring 620 to at least partially define the raceway for the rolling elements 628 to run over or roll on during use of the thrust roller bearing apparatus 600. In an embodiment, the support ring 608 and/or the support ring 620 may include a flange 642 configured to help maintain the rolling elements 628 between the stator 602 and the rotor 604. In other embodiments, the flange 642 may be omitted.

It is noted that in other embodiments, the disclosed thrust roller bearing apparatuses may be used in a number of applications, such as subterranean drilling systems, directional drilling systems, pumps, transmissions, gear boxes, and many other applications.

Figure 8:
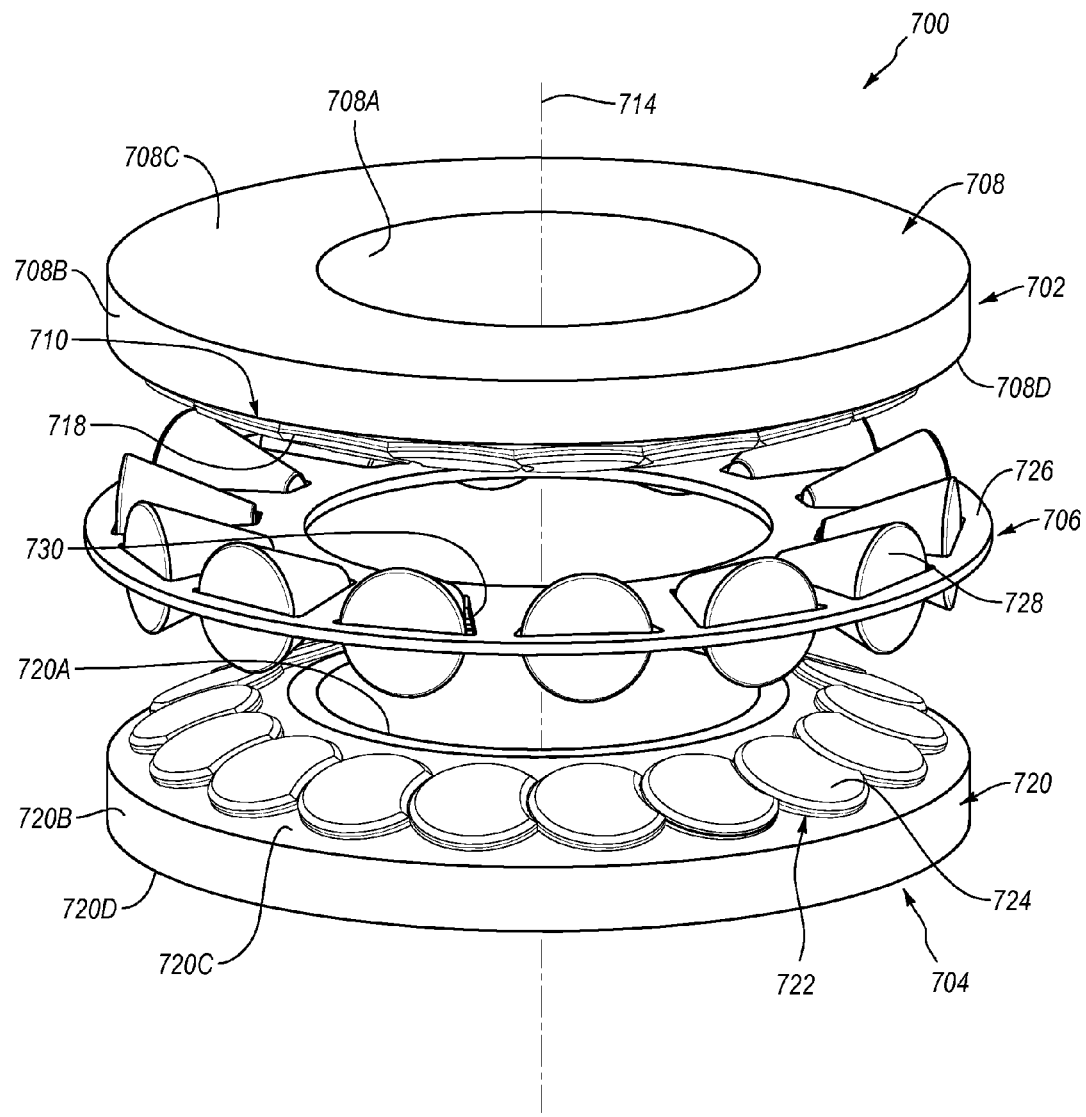
FIG. 8 is an exploded isometric view of a tapered thrust roller bearing apparatus according to another embodiment.

FIG. 8 is an exploded isometric view of a tapered thrust roller bearing apparatus 700 according to another embodiment. The tapered thrust roller bearing apparatus 700 may include a stator 702, a roller assembly 706, and a rotor 704. The roller assembly 706 may be interposed between the stator 702 and the rotor 704. The roller assembly 706 may optionally include a cage 726 having a plurality of cage pockets 730 formed in the cage 726 configured to retain a plurality of rolling elements 728. Each of the cage pockets 730 may have a substantially trapezoidal shape and may be distributed circumferentially about a thrust axis 714. The cage 726 may be made from one or more selected materials, such as carbon steel, stainless steel, tungsten, carbide material, combinations thereof, or any other suitable material. The rolling elements 728 may be rotatably mounted within the cage pockets 730. The rolling elements 728 may be generally conical having generally planar end portions (e.g., frustoconical). In other embodiments, one or more of the rolling elements 728 may have at least one generally curved end portion, generally concave end portion, generally convex end portion, generally pointed end portion, combinations thereof, or other suitable end portion configurations. One or more of the rolling elements 728 may be formed from any of the materials discussed above for the rolling elements 128.

The stator 702 may include a plurality of circumferentially adjacent superhard raceway elements 710 distributed about a thrust-axis 714 and configured and located to at least partially define a raceway for the rolling elements 728 to roll on or run over. The superhard raceway elements 710 may each include a raceway surface 718 configured to substantially lie on an imaginary conical surface. The superhard raceway elements 710 may exhibit a geometric shape that is generally formed by the intersection of two cylinders (e.g., lune, lens, or crescent-shaped). In other embodiments, at least one of the superhard raceway elements 710 may be generally trapezoidal, generally elliptical, combinations thereof, or any other suitable geometric shape. In an embodiment, the superhard raceway elements 710 may be mounted or otherwise attached to at least a lower surface 708D of the support ring 708. As shown, the support ring 708 may include an upper surface 708C, the lower surface 708D, an inner surface 708A, and an outer surface 708B. In an embodiment, the inner surface 708A and the outer surface 708B may extend between the upper surface 708C and the lower surface 708D. The inner surface 708A may be generally concentric and/or congruent relative to the outer surface 708B. In other embodiments, at least a portion of the inner surface 708A may be generally incongruent and/or not centered relative to at least a portion of the outer surface 708B. As illustrated, the lower surface 708D may form an angle relative to the upper surface 708C and may form at least a portion of a generally conical surface. For example, the lower surface 708D may extend and taper between the inner surface 708A and the outer surface 708B.

The rotor 704 may include a support ring 720 and a plurality of superhard raceway elements 722, with each of the superhard raceway elements 722 having a raceway surface 724 configured to lie on an imaginary conical surface. As shown, the superhard raceway elements 722 may have a geometric shape that is generally formed by the intersection of two cylinders. In other embodiments, the superhard raceway elements 722 may have a geometric shape that is generally oval, generally wedge-like, or any other suitable geometric shape. Like the superhard raceway elements 710, the superhard raceway elements 722 may be configured and positioned on the support ring 720 to at least partially define a raceway for the rolling elements 728 to run over or roll on during use. In an embodiment, the superhard raceway elements 722 may be mounted or otherwise attached to at least an upper surface 720C of the support ring 720. As shown, the support ring 720 may include the upper surface 720C, a lower surface 720D, an inner surface 720A, and an outer surface 720B. In an embodiment, the inner surface 720A and the outer surface 720B may extend between the upper surface 720C and the lower surface 720D. The inner surface 720A may be generally concentric and/or congruent relative to the outer surface 720B. In other embodiments, at least a portion of the inner surface 720A may be generally incongruent and/or not centered relative to at least a portion of the outer surface 720B. As illustrated, the upper surface 720C of the support ring 720 may form an angle relative to the lower surface 720D and may form at least a portion of a generally conical surface or a partial conical surface. For example, the upper surface 720C may generally extend and taper between the inner surface 720A and the outer surface 720B. In an embodiment, the support ring 720 and/or the support ring 708 may include a flange feature configured to help maintain the rolling elements 728 between the stator 702 and the rotor 704. In other embodiments, the flange feature(s) may be omitted. It is noted that in other embodiments, the rotor or stator may be configured as any of the previously described embodiments of thrust roller bearing assemblies.

Figure 9:
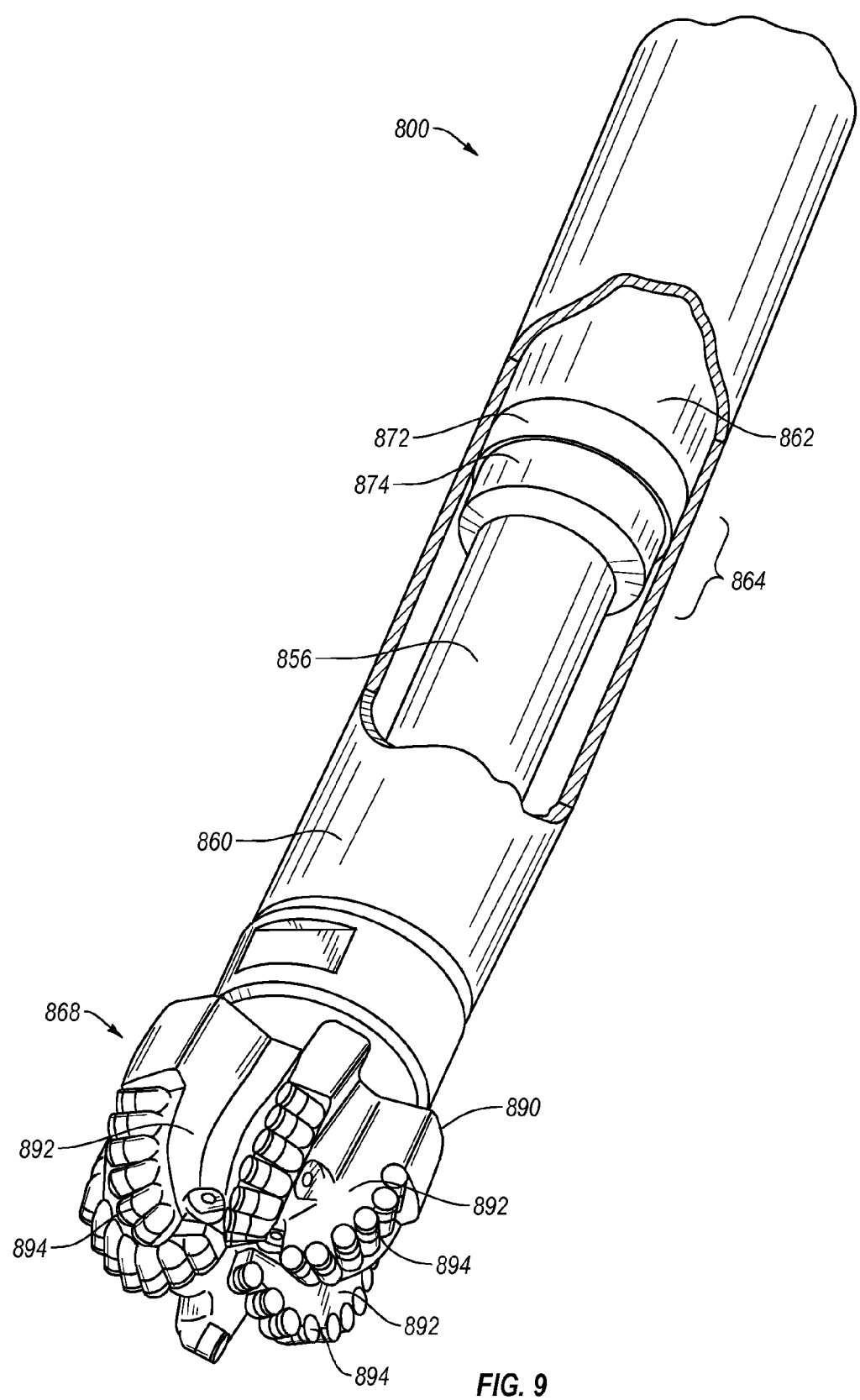
FIG. 9 is a schematic isometric cutaway view of a subterranean drilling system that may utilize any of the disclosed roller bearing apparatuses according to various embodiments.

Any of the embodiments for roller bearing apparatuses discussed above may be used in a subterranean drilling system. FIG. 9 is a schematic isometric cutaway view of a subterranean drilling system 800 according to an embodiment. The subterranean drilling system 800 may include a housing 860 enclosing a downhole drilling motor 862 (i.e., a motor, turbine, or any other device capable of rotating an output shaft) that may be operably connected to an output shaft 856. A thrust roller bearing apparatus 864 may be operably coupled to the downhole drilling motor 862. The thrust roller bearing apparatus 864 may be configured as any of the previously described thrust roller bearing apparatus embodiments. A rotary drill bit 868 may be configured to engage a subterranean formation and drill a borehole and may be connected to the output shaft 856. The rotary drill bit 868 is shown comprising a bit body 890 that includes radially and longitudinally extending blades 892 with a plurality of polycrystalline diamond cutting elements 894 secured to the blades 892. However, other embodiments may utilize different types of rotary drill bits, such as core bits and/or roller-cone bits. As the borehole is drilled, pipe sections may be connected to the subterranean drilling system 800 to form a drill string capable of progressively drilling the borehole to a greater depth within the earth.

The thrust roller bearing apparatus 864 may include a stator 872 that does not rotate and a rotor 874 that may be attached to the output shaft 856 and rotates with the output shaft 856. The thrust roller bearing apparatus 864 may further include a roller assembly (not shown) interposed between the stator 872 and the rotor 874. The roller assembly may include a cage having a plurality of cage pockets (not shown) for retaining a plurality of rolling elements (not shown). As discussed above, the thrust roller bearing apparatus 864 may be configured as any of the embodiments disclosed herein. For example, the stator 872 may include a plurality of circumferentially-distributed superhard raceway elements configured to at least partially define a raceway for the rolling elements to roll over or run on. In addition, the rotor 874 may include a plurality of circumferentially-distributed superhard raceway elements and configured to provide a raceway surface for the rolling elements to roll or run on. The rolling elements may, for example, include one or more superelastic materials such that the rolling elements exhibit non-linear elastic deformation and generally conform to the raceway during use.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A roller bearing apparatus, comprising:
   a rotor including:
      a first plurality of superhard raceway elements distributed circumferentially about an axis, each of the first plurality of superhard raceway elements including a raceway surface positioned and configured to form a first portion of a raceway;
      a first support ring that carries the first plurality of superhard raceway elements;
   a stator including:
      a second plurality of superhard raceway elements generally opposed the first plurality of superhard raceway elements, each of the second plurality of superhard raceway elements including a raceway surface positioned and configured to form a second portion of the raceway;
      a second support ring that carries the second plurality of superhard raceway element; and
   a plurality of rolling elements interposed between the rotor and the stator and positioned and configured to roll on the first race and second race, at least a portion of the raceway exhibiting a first modulus of elasticity greater than a second modulus of elasticity of at least a portion of the plurality of rolling elements, the first modulus of elasticity being about three (3) times greater to about fifty (50) times greater than the second modulus of elasticity.

2. The roller bearing apparatus of claim 1, wherein one or more of the plurality of rolling elements are further configured to exhibit non-linear elastic deformation during use.

3. The roller bearing apparatus of claim 1, wherein the first modulus of elasticity is about thirty (30) times greater to about forty five (45) times greater than the second modulus of elasticity.

4. The roller bearing apparatus of claim 1, wherein the first modulus of elasticity is about four (4) times greater to about fourteen (14) times greater than the second modulus of elasticity.

5. The roller bearing apparatus of claim 1, wherein one or more of the plurality of rolling elements comprise one or more superelastic materials.

6. The roller bearing apparatus of claim 5, wherein the one or more superelastic materials comprise a nickel-titanium alloy.

7. The roller bearing apparatus of claim 1, wherein the raceway is substantially planar, substantially cylindrical, or substantially conical.

8. The roller bearing apparatus of claim 1, wherein one or more of the first or second plurality of superhard raceway elements comprise a concavely-curved raceway surface or a convexly-curved raceway surface.

9. The roller bearing apparatus of claim 1, wherein one or more of the first or second plurality of superhard raceway elements comprise a substrate and a polycrystalline diamond table bonded to a substrate.

10. The roller bearing apparatus of claim 1, wherein the rotor, stator, and plurality of rolling elements form a radial roller bearing assembly, a thrust roller bearing assembly, or a tapered roller bearing assembly.

11. The roller bearing apparatus of claim 1, wherein the first plurality of superhard raceway elements and/or the second plurality of superhard raceway elements includes gaps between adjacent ones of the superhard raceway elements thereof, and wherein one or more of the first plurality of superhard raceway elements and/or the second plurality of superhard raceway elements include at least one side surface forming a respective oblique angle relative to the axis, and wherein the respective oblique angle is selected to at least partially inhibit the gaps from impeding the rolling elements during operation.

12. The roller bearing assembly of claim 11, wherein the respective oblique angle is greater than about forty (40) degrees.

13. The roller bearing assembly of claim 11, wherein the respective oblique angle is about forty (40) degrees to about eighty (80) degrees.

14. A roller bearing apparatus, comprising:
   a rotor including:
      a first plurality of superhard raceway elements distributed circumferentially about an axis, each of the first plurality of superhard raceway elements including a raceway surface positioned and configured to form a first portion of a raceway;
      a first support ring that carries the first plurality of superhard raceway elements;
   a stator including:
      a second plurality of superhard raceway elements generally opposed the first plurality of superhard raceway elements of the first roller bearing assembly, each of the second plurality of superhard raceway elements include a raceway surface positioned and configured to form a second portion of the raceway;

a second support ring that carries the second plurality of superhard raceway elements, and a plurality of generally elongated rolling elements interposed between the rotor and the stator and being positioned and configured to roll on the raceway, one or more of the plurality of generally elongated rolling elements including one or more superelastic materials.

15. The roller bearing apparatus of claim 14, wherein the one or more of the plurality of generally elongated rolling elements include a core body at least partially surrounded by the one or more superelastic materials.

16. The roller bearing apparatus of claim 14, wherein the one or more of the plurality of generally elongated rolling elements comprises a hollow cylindrical body.

17. The rolling bearing apparatus of claim 16, wherein the hollow cylindrical body comprises a nickel-titanium alloy.

18. The roller bearing apparatus of claim 14, further comprising a cage configured to retain the plurality of generally elongated rolling elements between the stator and the rotor.

19. A method for manufacturing a roller bearing apparatus, the method comprising:

providing a plurality of rolling elements, wherein one or more of the plurality of rolling elements include one or more superelastic materials; and providing a plurality of superhard raceway elements each of which includes a raceway surface positioned and configured to form at least a portion of a raceway for the rolling elements to roll over, at least a portion of the raceway exhibiting a first modulus of elasticity greater than a second modulus of elasticity of at least a portion of the one or more of the rolling elements, the first modulus of elasticity being about three (3) times greater to about fifty (50) times greater than the second modulus of elasticity.

20. The method of claim 19, further comprising affixing the superhard raceway elements to a first support ring and a second support ring, and wherein the rolling elements are interposed between the superhard raceway elements of the first support ring and the superhard raceway elements of the second support ring.

* * * * *